(12) United States Patent
Hosseini et al.

(10) Patent No.: US 12,022,402 B2
(45) Date of Patent: Jun. 25, 2024

(54) UPLINK TRANSMISSION TECHNIQUES IN LOW LATENCY WIRELESS COMMUNICATION SYSTEMS

(71) Applicant: QUALCOMM INCORPORATED, San Diego, CA (US)

(72) Inventors: Seyedkianoush Hosseini, San Diego, CA (US); Wanshi Chen, San Diego, CA (US); Jing Sun, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/465,632

(22) Filed: Sep. 2, 2021

(65) Prior Publication Data
US 2021/0400593 A1  Dec. 23, 2021

Related U.S. Application Data

(63) Continuation of application No. 15/793,782, filed on Oct. 25, 2017, now Pat. No. 11,323,966.
(Continued)

(51) Int. Cl.
*H04W 52/14* (2009.01)
*H04W 52/34* (2009.01)
(Continued)

(52) U.S. Cl.
CPC ....... *H04W 52/146* (2013.01); *H04W 52/346* (2013.01); *H04W 52/42* (2013.01);
(Continued)

(58) Field of Classification Search
CPC . H04W 52/146; H04W 72/21; H04W 52/346; H04W 52/42; H04W 72/1215; H04W 72/23; H04L 5/0007; H04L 5/0094
See application file for complete search history.

(56) References Cited

U.S. PATENT DOCUMENTS

| 8,503,425 B2 | 8/2013 | Chung et al. |
| 8,737,286 B2 | 5/2014 | Golitschek et al. |

(Continued)

FOREIGN PATENT DOCUMENTS

| CN | 101536350 A | 9/2009 |
| CN | 103313370 A | 9/2013 |

(Continued)

OTHER PUBLICATIONS

ZTE ., et al., "Study on sPUSCH transmission in sTTI", 3GPP TSG RAN WG1 Meeting #88bis, R1-1704647, Spokane, USA Apr. 3-7, 2017, https://www.3gpp.org/ftp/tsg_ran/WG1_RL1/TSGR1_88b/Docs/R1-1704647.zip, pp. 1-5.
(Continued)

*Primary Examiner* — Keith Ferguson
(74) *Attorney, Agent, or Firm* — Holland & Hart LLP

(57) ABSTRACT

Symbol alignment and power scaling are provided for different length transmission time intervals (TTIs) within predefined boundaries, such as boundaries of a slot of a subframe. Described techniques provide for identifying time and/or frequency resources for one or more TTIs and allocating such resources based on a location within a subframe, pilot signals that may be transmitted using the resources, other processing timelines, or any combination thereof. In some cases, a power allocation for symbols within a TTI may be determined based on the allocated resources for the TTI. Frequency hopping patterns and power scaling for three-symbol TTIs are also provided.

27 Claims, 18 Drawing Sheets

Related U.S. Application Data

(60) Provisional application No. 62/414,647, filed on Oct. 28, 2016.

(51) Int. Cl.
  *H04W 52/42* (2009.01)
  *H04W 72/12* (2023.01)
  *H04W 72/21* (2023.01)
  *H04L 5/00* (2006.01)
  *H04W 72/23* (2023.01)

(52) U.S. Cl.
  CPC ....... *H04W 72/1215* (2013.01); *H04W 72/21* (2023.01); *H04L 5/0007* (2013.01); *H04L 5/0094* (2013.01); *H04W 72/23* (2023.01)

(56) References Cited

U.S. PATENT DOCUMENTS

| | | |
|---|---|---|
| 8,737,502 B2 | 5/2014 | Luo et al. |
| 8,855,073 B2 | 10/2014 | Han et al. |
| 8,948,097 B2 | 2/2015 | Chen et al. |
| 9,055,535 B2 | 6/2015 | Iwai et al. |
| 9,113,456 B2 | 8/2015 | Cheon et al. |
| 9,949,275 B2 | 4/2018 | Chen et al. |
| 10,123,347 B2 | 11/2018 | Zeng et al. |
| 10,142,074 B2 | 11/2018 | Wang et al. |
| 10,980,022 B2 | 4/2021 | Zeng et al. |
| 2009/0296833 A1 | 12/2009 | Sawahashi |
| 2010/0202493 A1 | 8/2010 | Soliamn et al. |
| 2011/0205981 A1 | 8/2011 | Koo et al. |
| 2011/0249578 A1 | 10/2011 | Nayeb Nazar et al. |
| 2013/0077571 A1 | 3/2013 | Papasakellariou et al. |
| 2014/0003369 A1 | 1/2014 | Josiam et al. |
| 2016/0081084 A1 | 3/2016 | Blankenship et al. |
| 2016/0095137 A1* | 3/2016 | Chen .................. H04L 27/2601 370/329 |
| 2016/0143030 A1 | 5/2016 | Lee et al. |
| 2016/0182201 A1 | 6/2016 | Jiang et al. |
| 2016/0212765 A1 | 7/2016 | Talukdar et al. |
| 2016/0255594 A1 | 9/2016 | Vajapeyam et al. |
| 2016/0309466 A1 | 10/2016 | Chen et al. |
| 2016/0360518 A1 | 12/2016 | Noh et al. |
| 2017/0013618 A1 | 1/2017 | Shin |
| 2017/0135091 A1 | 5/2017 | Han et al. |
| 2017/0142702 A1 | 5/2017 | Yu et al. |
| 2017/0163388 A1 | 6/2017 | Wiemann et al. |
| 2017/0164352 A1 | 6/2017 | Yang et al. |
| 2017/0170944 A1 | 6/2017 | Ang et al. |
| 2017/0215206 A1 | 7/2017 | Cheng et al. |
| 2017/0230972 A1 | 8/2017 | Wang et al. |
| 2017/0245302 A1 | 8/2017 | Mukherjee et al. |
| 2017/0251464 A1 | 8/2017 | Mukherjee |
| 2017/0290004 A1 | 10/2017 | Yang et al. |
| 2018/0063858 A1 | 3/2018 | Au et al. |
| 2018/0076942 A1 | 3/2018 | Nory et al. |
| 2018/0077651 A1 | 3/2018 | Nory et al. |
| 2018/0077721 A1 | 3/2018 | Nory et al. |
| 2018/0124711 A1 | 5/2018 | Hosseini et al. |
| 2018/0227861 A1 | 8/2018 | Byun et al. |
| 2018/0279227 A1 | 9/2018 | Kim et al. |
| 2019/0150097 A1 | 5/2019 | Seo et al. |
| 2019/0159138 A1 | 5/2019 | Lee et al. |

FOREIGN PATENT DOCUMENTS

| | | | |
|---|---|---|---|
| EP | 3484214 A1 | 5/2019 | |
| JP | 2013192142 A | 9/2013 | |
| JP | 2013255278 A | 12/2013 | |
| KR | 20130098140 A | 9/2013 | |
| KR | 20140115326 A * | 9/2014 | ........... H04L 1/0038 |
| WO | WO2004064270 A1 | 7/2004 | |
| WO | WO-2010091423 A2 | 8/2010 | |
| WO | WO-2014096909 A1 | 6/2014 | |
| WO | WO-2015050743 A1 | 4/2015 | |
| WO | WO-2015148001 A1 | 10/2015 | |
| WO | WO2016048593 A1 | 3/2016 | |
| WO | WO-2016053844 A1 | 4/2016 | |
| WO | WO2016137816 A2 | 9/2016 | |
| WO | WO-2017052688 A1 | 3/2017 | |
| WO | WO-2017095553 A1 | 6/2017 | |
| WO | WO-2017095607 A1 | 6/2017 | |
| WO | WO-2017100100 A1 | 6/2017 | |
| WO | WO-2017100101 A1 | 6/2017 | |
| WO | WO-2017106027 A1 | 6/2017 | |
| WO | WO-2017111988 A1 | 6/2017 | |

OTHER PUBLICATIONS

LG Electronics: "Discussion on PUCCH Design for CSI in Shortened TTI", 3GPP TSG RAN WG1 Meeting #84bis, R1-162508, 3GPP Server Release Date (Apr. 22, 2016), Busan, Korea, Apr. 11-15, 2016, 5 Pages.

Ericsson: "Design Aspects of Spucch", 3GPP TSG-RAN WG1 #86bis, R1-1610329, Lisbon, Portugal Oct. 10-14, 2016, pp. 1-6, Sep. 30, 2016.

European Search Report—EP20193277—Search Authority—Munich —dated Nov. 17, 2020.

International Search Report and Written Opinion—PCT/US2017/058502—ISA/EPO—dated Apr. 9, 2018.

LG Electronics: "Discussion on sPUCCH for HARQ-ACK in Latency Reduction", 3GPP Draft, 3GPP TSG RAN WG1 Meeting #85, R1-164545 Discussion on sPUCCH for HARQ-ACK in Latency Reduction, 3rd Generation Partnership Project (3GPP), Mobile Competence Centre, 650, Route Des Lucioles, F-06921 Sophia-Antipolis, vol. RAN WG1, No. Nanjing, China, May 23, 2016-May 27, 2016 May 14, 2016 (May 14, 2016), XP051096391, 8 Pages, Retrieved from the Internet: URL: http://www.3gpp.org/ftp/tsg_ran/WG1_RL1/TSGR1_85/Docs/ [retrieved on May 14, 2016], p. 3.

LG Electronics: "Discussion on sPUCCH for CSI in Latency Reduction", R1-164546, 3GPP TSG RAN WG1 Meeting #85, Nanjing, China, May 23-27, 2016, 5 Pages.

NTT DOCOMO, et al., "sPUCCH for Shortened TTI", 3GPP Draft, 3GPP TSG-RAN WG1 Meeting #86bis, R1-1610047, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150072, 8 Pages, Retrieved from the Internet: URL: http://www.3gpp.org/ftp/Meetings_3GPP_SYNC/RAN1/Docs/ [retrieved on Oct. 9, 2016], p. 1.

Partial International Search Report—PCT/US2017/058502—ISA/EPO—dated Jan. 16, 2018.

Sharp: "Link Level Evaluation Results of Shortened TTI for PUCCH", 3GPP Draft, 3GPP TSG-RAN WG1 Meeting #84bis, R1-163402, 3rd Generation Partnership Project (3GPP), Mobile Competence Centre; 650, Route Des Lucioles, F-06921 Sophia-Antipolis Cedex, France, vol. RAN WG1, No. Susan, Korea, Apr. 11, 2016-Apr. 15, 2016, Apr. 18, 2016 (Apr. 18, 2016), XP051090394, pp. 1-10, Retrieved from the Internet: URL: http://www.3gpp.org/ftp/tsg_ran/WG1_RL1/TSGR1_84b/Docs/ [retrieved on Apr. 18, 2016], p. 3.

Huawei et al., "PUSCH Design for Short TTI", 3GPP TSG RAN WG1 Meeting #86, R1-166153, Gothenburg, Sweden, Aug. 22-26, 2016, 3 Pages.

Intel Corporation: "Distributed Resource Allocation for D2D Communication", 3GPP TSG RAN WG1 Meeting #77, R1-142016 Intel—D2DRA—Mode2, 3rd Generation Partnership Project, Mobile Competence Centre, 650, Route Des Lucioles, F-06921 Sophia-Antipolis Cedex, France, vol. RAN WG1, No. Seoul, Korea, May 19, 2014-May 23, 2014, May 18, 2014, XP050789136, pp. 1-8.

Yang F et al., "Research on Baseband Technology of Filtered-OFDM Wireless Communication", Journal of Chongqing University of Technology (Natural Science), vol. 30, No. 09, Sep. 15, 2016, 113-117.

Ericsson: "5G- Key Component of the Networked Society," 3GPP RAN Workshop on 5G, RWS-150009, Phoenix, AZ, USA, Sep. 17-18, 2015, 55 pgs., XP051043759, 3rd Generation D Partnership Project, Sophia-Antipolis Cedex, France, Retrieved from the Inter-

(56) References Cited

OTHER PUBLICATIONS net: URL: http://www.3gpp.org/ftp/workshop/2015-09-17_18_RAN_5G/Docs/[retrieved on Aug. 3, 2017], Slides 5, 33-34.
Ericsson: "Frame Structure and DMRS Positions", R1-1609768, 3GPP TSG-RAN WG1 #86bis, Lisbon, Portugal, Oct. 10-14, 2016, pp. 1-5.
Ericsson: "Summary of E-mail Discussions on Uplink Control Signaling", TSG-RAN WG1#87, R1-1613162, 3rd Generation Partnership Project, Mobile Competence Centre, 650, Route Des Lucioles, F-06921 Sophia-Antipoli, vol. Ran WG1, No. Reno, NV, USA, 20161114-20161118, Nov. 19, 2016, XP051191041, 23 Pages.
Huawei et al., "Discussion on Downlink Control Channel Design", 3GPP Draft; R1-1609432, 3GPP TSG-RAN WG1#86b, 3RD Generation Partnership Project (3GPP), Mobile Competence Centre; 650, Route Des Lucioles; F-06921 Sophia-Antipolis Cedex; France, vol. Ran WG1, No. Lisbon, Portugal; Oct. 9, 2016, XP051149475, Retrieved from the Internet: URL: http://www.3gpp.org/ftp/tsg_ran/WG1_RL1/TSGR1_86b/Docs/R1-1609432.zip [retrieved on Oct. 9, 2016], 5 pages.
Huawei et al., "Discussion on Time Domain Structures", 3GPP Draft, 3GPPTSG RAN WG1 Meeting #86, R1-166104, 3rd Generation Partnership Project (3GPP), Mobile Competence Centre, 650, Route Des Lucioles, F-06921 Sophia-Antipolis Cedex, France, vol. Ran WG1, No. Gothenburg, Sweden; 20160822-20160826, Aug. 21, 2016 (Aug. 21, 2016), 6 Pages, XP051125215, Section 2.3.
Huawei et al., "Overview of Frame Structure for NR", 3GPP Draft; R1-166102, 3RD Generation Partnership Project (3GPP), Mobile Competence Centre; 650, Route Des Lucioles; F-06921 Sophia-Antipolis Cedex; France, vol. Ran WG1, No. Gothenburg, Sweden; Aug. 21, 2016, XP051140062, Retrieved from the Internet: URL: http://www.3gpp.org/ftp/Meetings_3GPP_SYNC/RAN1/Docs/ [retrieved on Aug. 21, 2016], 8 pages.
LG Electronics: "On multiplexing between eMBB and Urllc", 3GPP TSG RAN WG1 Meeting #86bis, R1-1609236, Lisbon, Portugal, Oct. 10-14, 2016, pp . 1-12.
Qualcomm Incorporated: "Advanced Frame Structure", 3GPP TSG-RAN WG1#86bis, R1-1610132, 3rd Generation Partnership Project, Mobile Competence Centre, 650, Route Des Lucioles, F-06921 Sophia-Antipolis Cedex, France, vol. Ran WG1, No. Lisbon, Portugal, 20161010-20161014, Oct. 1, 2016, XP051159935, 9 Pages, Chapter 3.
Qualcomm Incorporated: "Candidate Frame Structures", 3GPP TSG-RAN WG1 #85, 3GPP Draft; R1-164695, 3rd Generation Partnership Project (3GPP), Mobile Competence Centre; 650, Route Des Lucioles; F-06921 Sophia-Antipolis Cedex; France, vol. Ran WG1, No. Nanjing, China; May 14, 2016, pp. 1-8, 20160523-20160527, XP051089940, Retrieved from the Internet: URL: https://www.3gpp.org/ftp/tsg_ran/WG1_RL1/TSGR1_85/Docs/R1-164695.zip [retrieved on May 14, 2016].
Qualcomm Incorporated: "Channelization of 2-Symbol Short Pucch", 3GPP Draft; R1-1708618, 3RD Generation Partnership Project (3GPP), Mobile Competence Centre; 650, Route Des Lucioles; F-06921 Sophia-Antipolis Cedex; France, vol. Ran WG1, No. Hangzhou, China; May 14, 2017, XP051273807, Retrieved from the Internet: URL: http://www.3gpp.org/ftp/Meetings_3GPP_SYNC/RAN1/Docs/ [retrieved on May 14, 2017], 5 pages.
Qualcomm Incorporated: "On UCI Aspects", 3GPP Draft; R1-1708648, 3RD Generation Partnership Project (3GPP), Mobile Competence Centre; 650, Route Des Lucioles; F-06921 Sophia-Antipolis Cedex; France, vol. Ran WG1, No. Hangzhou, May 14, 2017, XP051273835, Retrieved from the Internet: URL: http://www.3gpp.org/ftp/Meetings_3GPP_SYNC/RAN1/Docs/ [retrieved on May 14, 2017], 4 pages.
Qualcomm Incorporated: "UL Channelization in Short UL Duration", 3GPP Draft; R1-1612073, 3RD Generation Partnership Project (3GPP), Mobile Competence Centre; 650, Route Des Lucioles; F-06921 Sophia-Antipolis Cedex; France, vol. Ran WG1, No. Reno, U.S.A; Nov. 5, 2016, XP051190671, Retrieved from the Internet: URL: http://www.3gpp.org/ftp/tsg_ran/WG1_RL 1/TSGR1_87/Docs/ [retrieved on Nov. 5, 2016], 8 pages.
Qualcomm Incorporated: "UL Waveform Configuration", 3GPP Draft, 3GPP TSG-RAN WG1 #87, R1-1612075, 3RD Generation Partnership Project (3GPP), Mobile Competence Centre, 650, Route Des Lucioles, F-06921, Sophia-Antipolis Cedex, France, vol. RAN WG1, No. Reno, USA, Nov. 14-18, 2016, (Nov. 18, 2016), XP051176035, 6 pages.
Qualcomm Incorporated: "User Multiplexing of DFTs-OFDM and OFDM in Uplink", 3GPP Draft, 3GPP TSG-RAN WG1 #86b, R1-1610114, User Multiplexing of DFTs-OFDM and OFDM in Uplink, 3rd Generation Partnership Project (3GPP), Mobile Competence Centre, 650, Route Des Lucioles, F-06921 Sophia-Antipolis Cedex, France, vol. RAN WG1, No. Lisbon, Portugal, 20161010-20161014 Oct. 9, 2016 (Oct. 9, 2016), XP051150138, 5 Pages.

\* cited by examiner

UPLINK TRANSMISSION TECHNIQUES IN LOW LATENCY WIRELESS COMMUNICATION SYSTEMS

CROSS REFERENCES

The present Application for Patent is a Continuation of U.S. patent application Ser. No. 15/793,782 by Hosseini et al., entitled "Uplink Transmission Techniques In Low Latency Wireless Communication Systems," filed Oct. 25, 2017, which claims priority to U.S. Provisional Patent Application No. 62/414,647 by Hosseini et al., entitled "Uplink Transmission Techniques In Low Latency Wireless Communication Systems," filed Oct. 28, 2016, both of which are assigned to the assignee hereof and expressly incorporated by reference herein in their entirety.

BACKGROUND

The following relates generally to wireless communication, and more specifically to uplink transmission techniques in low latency wireless communication systems.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using a transmission time interval (TTI) that is reduced in length relative to legacy LTE TTIs. Such a TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time and/or frequency resources. Efficient allocation of such resource may help to increase the efficiency of a wireless communication system.

SUMMARY

The described techniques relate to improved methods, systems, devices, or apparatuses that support uplink transmission techniques in low latency wireless communication systems. Generally, the described techniques provide for identifying time and/or frequency resources for one or more sTTIs and allocating such resources based on a location within a subframe, pilot signals that may be transmitted using the resources, other processing timelines, or any combination thereof. In some cases, a power allocation for symbols within a sTTI may be determined based on the allocated resources for the sTTI. In some examples, the sTTIs may include a three OFDM symbol sTTI and one or more two OFDM symbol sTTIs, and a power offset may be applied for the two-OFDM symbol TTIs relative to the three OFDM symbol TTI to compensate for reduced time diversity and achievable energy per bit of the two OFDM symbol sTTIs relative to the three OFDM symbol sTTI.

In some cases, the sTTI may include a three OFDM symbol TTI in which a first and a second OFDM symbol may be transmitted using a first frequency resource, and a third OFDM symbol transmitted using a second frequency resource. In some examples, a power offset may be applied for the third symbol to compensate for reduced time diversity and achievable energy per bit of the third symbol relative to the first and second symbols. In some cases, pilot signals may be configured to be transmitted based on resources allocated for the sTTIs.

A method of wireless communication is described. The method may include identifying uplink resources for an uplink transmission that span two or more TTIs including a first TTI that has a different number of OFDM symbols than a second TTI, determining a first transmission power for the first TTI, applying a power offset to the first transmission power to determine a second transmission power for the second TTI, and transmitting an uplink grant for the uplink transmission to a UE, the uplink grant including an indication of the uplink resources and one or more of the first transmission power or the second transmission power.

An apparatus for wireless communication is described. The apparatus may include means for identifying uplink resources for an uplink transmission that span two or more TTIs including a first TTI that has a different number of OFDM symbols than a second TTI, means for determining a first transmission power for the first TTI, means for applying a power offset to the first transmission power to determine a second transmission power for the second TTI, and means for transmitting an uplink grant for the uplink transmission to a user equipment (UE), the uplink grant including an indication of the uplink resources and one or more of the first transmission power or the second transmission power.

Another apparatus for wireless communication is described. The apparatus may include a processor, memory in electronic communication with the processor, and instructions stored in the memory. The instructions may be operable to cause the processor to identify uplink resources for an uplink transmission that span two or more TTIs including a first TTI that has a different number of OFDM symbols than a second TTI, determine a first transmission power for the first TTI, apply a power offset to the first transmission power to determine a second transmission power for the second TTI, and transmit an uplink grant for the uplink transmission to a UE, the uplink grant including an indication of the uplink resources and one or more of the first transmission power or the second transmission power.

A non-transitory computer readable medium for wireless communication is described. The non-transitory computer-readable medium may include instructions operable to cause a processor to identify uplink resources for an uplink transmission that span two or more TTIs including a first TTI that has a different number of OFDM symbols than a second TTI, determine a first transmission power for the first TTI, apply a power offset to the first transmission power to determine a second transmission power for the second TTI, and transmit an uplink grant for the uplink transmission to a UE, the uplink grant including an indication of the uplink resources and one or more of the first transmission power or the second transmission power.

Some examples of the method, apparatus, and non-transitory computer-readable medium described above may further include processes, features, means, or instructions for identifying that the first TTI has three OFDM symbols and the second TTI has two OFDM symbols. In some examples of the method, apparatus, and non-transitory computer-readable medium described above, the power offset increases a transmission power for the second TTI to compensate for reduced time diversity and achievable energy per bit of the second TTI relative to the first TTI.

Some examples of the method, apparatus, and non-transitory computer-readable medium described above may further include processes, features, means, or instructions for transmitting the power offset to the UE. In some examples of the method, apparatus, and non-transitory computer-readable medium described above, the power offset may be transmitted in the uplink grant. Some examples of the method, apparatus, and non-transitory computer-readable medium described above may further include processes, features, means, or instructions for configuring the UE with the power offset prior to the identifying resources for the uplink transmission. In some examples of the method, apparatus, and non-transitory computer-readable medium described above, the two or more TTIs may be allocated uplink resources located within a slot of a wireless transmission subframe.

A method of wireless communication is described. The method may include identifying resources for a first uplink TTI that has three OFDM symbols, allocating a first frequency resource for transmission of a first subset of the OFDM symbols, allocating a second frequency resource for transmission of a second subset of the OFDM symbols, the second frequency resource being different than the first frequency resource, and transmitting an uplink grant for the first uplink TTI to a UE, the uplink grant including an indication of the first frequency resource and the second frequency resource.

An apparatus for wireless communication is described. The apparatus may include means for identifying resources for a first uplink transmission time interval TTI that has three OFDM symbols, means for allocating a first frequency resource for transmission of a first subset of the OFDM symbols, means for allocating a second frequency resource for transmission of a second subset of the OFDM symbols, the second frequency resource being different than the first frequency resource, and means for transmitting an uplink grant for the first uplink TTI to a UE, the uplink grant including an indication of the first frequency resource and the second frequency resource.

Another apparatus for wireless communication is described. The apparatus may include a processor, memory in electronic communication with the processor, and instructions stored in the memory. The instructions may be operable to cause the processor to identify resources for a first uplink TTI that has three OFDM symbols, allocate a first frequency resource for transmission of a first subset of the OFDM symbols, allocate a second frequency resource for transmission of a second subset of the OFDM symbols, the second frequency resource being different than the first frequency resource, and transmit an uplink grant for the first uplink TTI to a UE, the uplink grant including an indication of the first frequency resource and the second frequency resource.

A non-transitory computer readable medium for wireless communication is described. The non-transitory computer-readable medium may include instructions operable to cause a processor to identify resources for a first uplink TTI that has three OFDM symbols, allocate a first frequency resource for transmission of a first subset of the OFDM symbols, allocate a second frequency resource for transmission of a second subset of the OFDM symbols, the second frequency resource being different than the first frequency resource, and transmit an uplink grant for the first uplink TTI to a UE, the uplink grant including an indication of the first frequency resource and the second frequency resource.

In some examples of the method, apparatus, and non-transitory computer-readable medium described above, the first subset of the OFDM symbols has two OFDM symbols and the second subset of the OFDM symbols has one OFDM symbol. Some examples of the method, apparatus, and non-transitory computer-readable medium described above may further include processes, features, means, or instructions for configuring a first OFDM symbol of the first subset of the OFDM symbols for data transmission and a second OFDM symbol of the first subset of the OFDM symbols for a pilot signal transmission. Some examples of the method, apparatus, and non-transitory computer-readable medium described above may further include processes, features, means, or instructions for configuring the one OFDM symbol of the second subset of the OFDM symbols for transmission of both data and a pilot signal.

Some examples of the method, apparatus, and non-transitory computer-readable medium described above may further include processes, features, means, or instructions for determining that the first subset of the OFDM symbols is to be transmitted at a beginning of a wireless transmission subframe. Some examples of the method, apparatus, and non-transitory computer-readable medium described above may further include processes, features, means, or instructions for configuring the first subset of the OFDM symbols to have two OFDM symbols. Some examples of the method, apparatus, and non-transitory computer-readable medium described above may further include processes, features, means, or instructions for determining that a first OFDM symbol of the first subset of the OFDM symbols is located at the beginning of the wireless transmission subframe and is to be unused for data or pilot signal transmissions. Some examples of the method, apparatus, and non-transitory computer-readable medium described above may further include processes, features, means, or instructions for configuring a second OFDM symbol of the first subset of the OFDM symbols for transmission of both data and a pilot signal.

Some examples of the method, apparatus, and non-transitory computer-readable medium described above may further include processes, features, means, or instructions for determining that the second subset of the OFDM symbols is to be transmitted at an end of a wireless transmission subframe, and configuring the second subset of the OFDM symbols to have two OFDM symbols. Some examples of the method, apparatus, and non-transitory computer-readable medium described above may further include processes, features, means, or instructions for determining that a last OFDM symbol of the second subset of the OFDM symbols is to be located at the end of the wireless transmission subframe and is to be used for a sounding reference signal (SRS) transmissions, and configuring a first OFDM symbol of the second subset of the OFDM symbols that precedes the last OFDM symbol for transmission of both data and a pilot signal.

Some examples of the method, apparatus, and non-transitory computer-readable medium described above may further include processes, features, means, or instructions for determining a first transmission power for the first subset of the OFDM symbols, the first subset having two OFDM symbols, and applying a power offset to the first transmission power to determine a second transmission power for the second subset of the OFDM symbols, the second subset having one OFDM symbol. In some examples of the method, apparatus, and non-transitory computer-readable medium described above, the power offset increases a transmission power for the second subset of the OFDM symbols to compensate for reduced time diversity and achievable energy per bit of the second subset of the OFDM symbols relative to the first subset of the OFDM symbols.

Some examples of the method, apparatus, and non-transitory computer-readable medium described above may further include processes, features, means, or instructions for transmitting the power offset to the UE. In some examples of the method, apparatus, and non-transitory computer-readable medium described above, the power offset may be transmitted in the uplink grant. Some examples of the method, apparatus, and non-transitory computer-readable medium described above may further include processes, features, means, or instructions for configuring the UE with the power offset prior to the identifying resources for the first uplink TTI.

A method of wireless communication is described. The method may include receiving an uplink resource allocation from a base station for an uplink transmission, the uplink resource allocation identifying uplink resources that span two or more TTIs including a first TTI and a second TTI that have different numbers of OFDM symbols, identifying a first uplink transmission power for the first TTI, applying a power offset to the first uplink transmission power to determine a second uplink transmission power for the second TTI, and transmitting the uplink transmission based at least in part on the first uplink transmission power and the second uplink transmission power.

An apparatus for wireless communication is described. The apparatus may include means for receiving an uplink resource allocation from a base station for an uplink transmission, the uplink resource allocation identifying uplink resources that span two or more TTIs including a first TTI and a second TTI that have different numbers of OFDM symbols, means for identifying a first uplink transmission power for the first TTI, means for applying a power offset to the first uplink transmission power to determine a second uplink transmission power for the second TTI, and means for transmitting the uplink transmission based at least in part on the first uplink transmission power and the second uplink transmission power.

Another apparatus for wireless communication is described. The apparatus may include a processor, memory in electronic communication with the processor, and instructions stored in the memory. The instructions may be operable to cause the processor to receive an uplink resource allocation from a base station for an uplink transmission, the uplink resource allocation identifying uplink resources that span two or more TTIs including a first TTI and a second TTI that have different numbers of OFDM symbols, identify a first uplink transmission power for the first TTI, apply a power offset to the first uplink transmission power to determine a second uplink transmission power for the second TTI, and transmit the uplink transmission based at least in part on the first uplink transmission power and the second uplink transmission power.

A non-transitory computer readable medium for wireless communication is described. The non-transitory computer-readable medium may include instructions operable to cause a processor to receive an uplink resource allocation from a base station for an uplink transmission, the uplink resource allocation identifying uplink resources that span two or more TTIs including a first TTI and a second TTI that have different numbers of OFDM symbols, identify a first uplink transmission power for the first TTI, apply a power offset to the first uplink transmission power to determine a second uplink transmission power for the second TTI, and transmit the uplink transmission based at least in part on the first uplink transmission power and the second uplink transmission power.

Some examples of the method, apparatus, and non-transitory computer-readable medium described above may further include processes, features, means, or instructions for identifying that the first TTI has three OFDM symbols and the second TTI has two OFDM symbols. In some examples of the method, apparatus, and non-transitory computer-readable medium described above, the power offset increases a transmission power for the second TTI to compensate for reduced time diversity and achievable energy per bit of the second TTI relative to the first TTI. In some examples of the method, apparatus, and non-transitory computer-readable medium described above, the power offset may be received in the uplink resource allocation. Some examples of the method, apparatus, and non-transitory computer-readable medium described above may further include processes, features, means, or instructions for receiving, prior to receiving the uplink resource allocation, a configuration that identifies the power offset. In some examples of the method, apparatus, and non-transitory computer-readable medium described above, the two or more TTIs may be allocated uplink resources located within a slot of a wireless transmission subframe.

A method of wireless communication is described. The method may include receiving an uplink resource allocation from a base station for an uplink transmission, the uplink resource allocation identifying an uplink TTI that has three OFDM symbols, identifying a first frequency resource for transmitting a first subset of the OFDM symbols based at least in part on the uplink resource allocation, identifying a second frequency resource for transmitting a second subset of the OFDM symbols based at least in part on the uplink resource allocation, and transmitting the uplink transmission using the first frequency resource and the second frequency resource.

An apparatus for wireless communication is described. The apparatus may include means for receiving an uplink resource allocation from a base station for an uplink transmission, the uplink resource allocation identifying an uplink TTI that has three OFDM symbols, means for identifying a first frequency resource for transmitting a first subset of the OFDM symbols based at least in part on the uplink resource allocation, means for identifying a second frequency resource for transmitting a second subset of the OFDM symbols based at least in part on the uplink resource allocation, and means for transmitting the uplink transmission using the first frequency resource and the second frequency resource.

Another apparatus for wireless communication is described. The apparatus may include a processor, memory in electronic communication with the processor, and instructions stored in the memory. The instructions may be operable to cause the processor to receive an uplink resource allocation from a base station for an uplink transmission, the uplink resource allocation identifying an uplink TTI that has three OFDM symbols, identify a first frequency resource for transmitting a first subset of the OFDM symbols based at least in part on the uplink resource allocation, identify a second frequency resource for transmitting a second subset of the OFDM symbols based at least in part on the uplink resource allocation, and transmit the uplink transmission using the first frequency resource and the second frequency resource.

A non-transitory computer readable medium for wireless communication is described. The non-transitory computer-readable medium may include instructions operable to cause a processor to receive an uplink resource allocation from a base station for an uplink transmission, the uplink resource allocation identifying an uplink TTI that has three OFDM symbols, identify a first frequency resource for transmitting a first subset of the OFDM symbols based at least in part on the uplink resource allocation, identify a second frequency resource for transmitting a second subset of the OFDM symbols based at least in part on the uplink resource allocation, and transmit the uplink transmission using the first frequency resource and the second frequency resource.

In some examples of the method, apparatus, and non-transitory computer-readable medium described above, the first subset of the OFDM symbols has two OFDM symbols and the second subset of the OFDM symbols has one OFDM symbol. Some examples of the method, apparatus, and non-transitory computer-readable medium described above may further include processes, features, means, or instructions for configuring a first OFDM symbol of the first subset of the OFDM symbols for data transmission and a second OFDM symbol of the first subset of the OFDM symbols for a pilot signal transmission. Some examples of the method, apparatus, and non-transitory computer-readable medium described above may further include processes, features, means, or instructions for configuring the one OFDM symbol of the second subset of the OFDM symbols for transmission of both data and a pilot signal.

In some examples of the method, apparatus, and non-transitory computer-readable medium described above, the first subset of the OFDM symbols is to be transmitted at a beginning of a wireless transmission subframe, and the first subset of the OFDM symbols has two OFDM symbols. In some examples of the method, apparatus, and non-transitory computer-readable medium described above, a first OFDM symbol of the first subset of the OFDM symbols is located at the beginning of the wireless transmission subframe and is unallocated for data or pilot signal transmissions, and a second OFDM symbol of the first subset of the OFDM symbols is allocated for transmission of both data and a pilot signal.

In some examples of the method, apparatus, and non-transitory computer-readable medium described above, the second subset of the OFDM symbols is to be transmitted at an end of a wireless transmission subframe, and the second subset of the OFDM symbols may have two OFDM symbols. In some examples of the method, apparatus, and non-transitory computer-readable medium described above, a last OFDM symbol of the second subset of the OFDM symbols is located at the end of the wireless transmission subframe and is configured for a SRS transmission, and a first OFDM symbol of the second subset of the OFDM symbols that precedes the last OFDM symbol may be allocated for transmission of both data and a pilot signal.

Some examples of the method, apparatus, and non-transitory computer-readable medium described above may further include processes, features, means, or instructions for identifying a first transmission power for the first subset of the OFDM symbols, the first subset having two OFDM symbols, and applying a power offset to the first transmission power to determine a second transmission power for the second subset of the OFDM symbols, the second subset having one OFDM symbol. In some examples of the method, apparatus, and non-transitory computer-readable medium described above, the power offset increases a transmission power for the second subset of the OFDM symbols to compensate for reduced time diversity and achievable energy per bit of the second subset of the OFDM symbols relative to the first subset of the OFDM symbols. Some examples of the method, apparatus, and non-transitory computer-readable medium described above may further include processes, features, means, or instructions for receiving the power offset with the uplink resource allocation. Some examples of the method, apparatus, and non-transitory computer-readable medium described above may further include processes, features, means, or instructions for receiving, prior to the receiving the uplink resource allocation, a configuration with the power offset.

DETAILED DESCRIPTION

Figure 1:
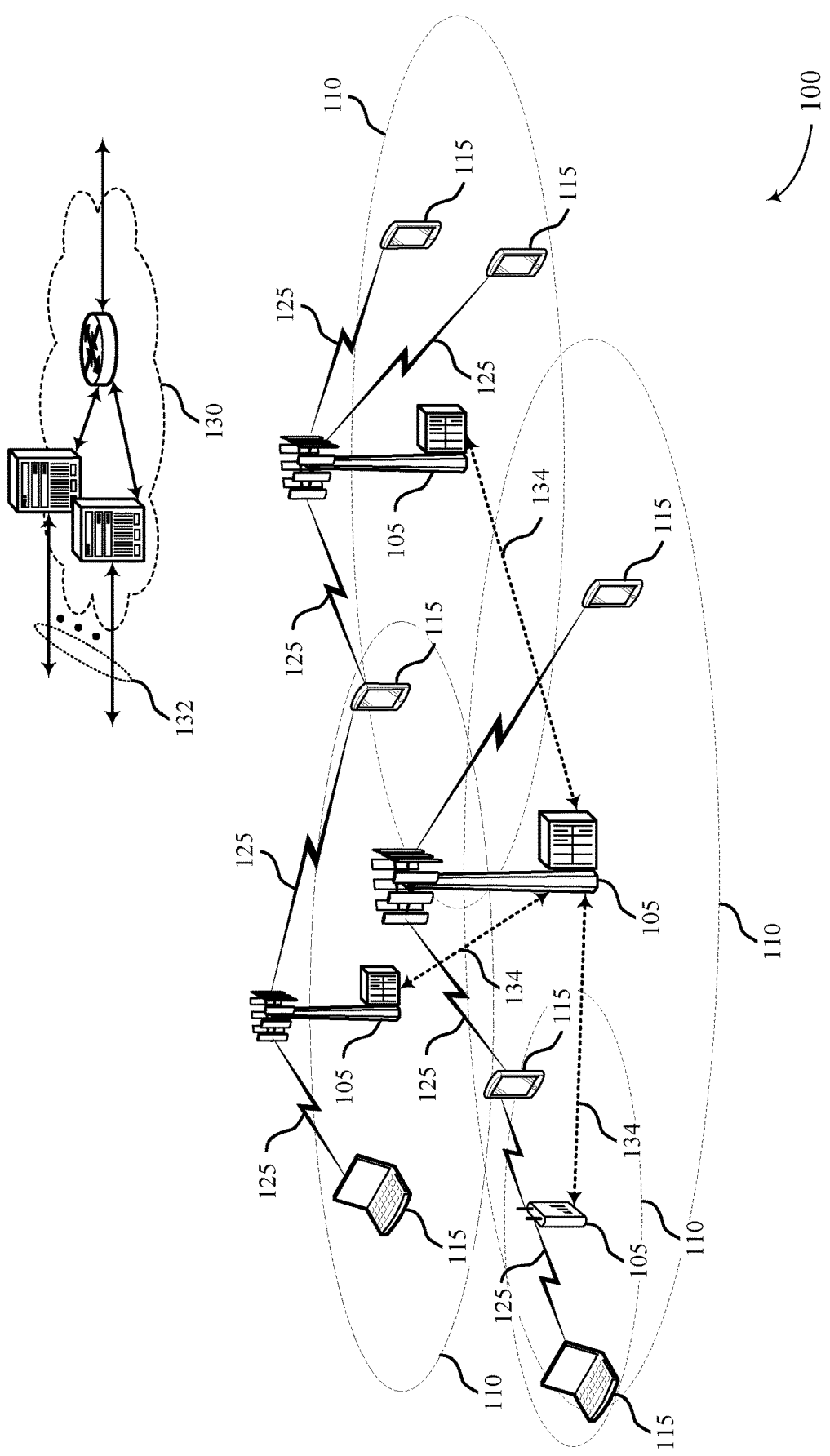
FIG. 1 illustrates an example of a system for wireless communication that supports uplink transmission techniques in low latency wireless communication systems in accordance with aspects of the present disclosure.

Improved methods, systems, devices, or apparatuses of various examples may be used to support uplink transmission techniques in low latency wireless communication systems. Resources allocated for low latency communication may be used for uplink and downlink communication over reduced length transmission time intervals (TTIs) (e.g., shortened TTIs (sTTIs)), which may have TTI boundaries within or aligned with boundaries of a slot of a legacy LTE TTI. In some examples, the sTTIs may span two or three OFDM symbols, and each slot may have two two-symbol TTIs and one three-symbol TTI. In such a manner, all seven symbols of a slot may be utilized and system resources may be more efficiently utilized relative to a case where three two-symbol sTTIs would be included in a seven-symbol slot.

Various techniques as disclosed herein may provide for identifying time and/or frequency resources for one or more sTTIs and allocating such resources based on a location within a subframe, pilot signals that may be transmitted using the resources, other processing timelines, or any combination thereof. In some cases, a power allocation for symbols within a sTTI may be determined based on whether the sTTI is a two symbol TTI or a three symbol TTI. In some examples, a transmission power for a three symbol sTTI may be determined, and a power offset applied thereto to determine a transmission power for a two symbol TTI. Such a power offset may help to compensate for reduced time diversity and achievable energy per bit of the two OFDM symbol sTTI relative to the three OFDM symbol sTTI.

In some cases, the sTTI may include a three OFDM symbol TTI in which a first and a second symbol may be transmitted using a first frequency resource, and a third symbol transmitted using a second frequency resource. In some examples, a transmission power for the first and second symbols may be determined, and a power offset applied thereto to determine a transmission power for the third symbol. Such a power offset may be applied to compensate for reduced time diversity and achievable energy per bit of the third symbol relative to the first and second symbols. Such power offsets for two symbol TTIs or single symbols in a different frequency resource within a TTI may be established power offsets, may be configured by a base station upon establishing a connection with a UE, may be semi-statically signaled, or may be dynamically signaled in a resource grant to the UE.

In some cases, pilot signals may be configured to be transmitted based on resources allocated for the sTTIs. For example, in cases where two symbols of a three symbol TTI are transmitted in a first frequency resource, one of the symbols may be configured for data transmission and the other symbol configured for a pilot signal transmission. In such cases, a third symbol of the sTTI transmitted using a different frequency resource may include both data and a pilot signal (e.g., data and pilot signal transmissions being transmitted in different cyclic shifts of the symbol). In some examples, an alignment of symbols within a sTTI may be identified based on one or more other parameters of a symbol, such as an empty symbol that may be provided to allow for processing at a UE, or a symbol that is to have another type of transmission such as a sounding reference signal (SRS) transmission. In such cases, the frequency resource having two of the three symbols of the sTTI may be configured to have the symbol that is unused for data or pilot transmission, with the remaining symbol in that frequency resource configured for both data and pilot signal transmission.

Such low latency communications may be used in system, for example, that may support multiple different services for data communications that may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service). Correspondingly, communications that are more delay-tolerant may be served through a service that provides relatively higher throughput with somewhat higher latency, such as a mobile broadband service (e.g., an enhanced mobile broadband (eMBB) service). In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communication system.

Aspects of the disclosure are initially described in the context of a wireless communications system. Aspects of the disclosure are further illustrated by and described with reference to apparatus diagrams, system diagrams, and flowcharts that relate to uplink transmission techniques in low latency wireless communication systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (e.g., mission critical or URLLC) communications, low latency communications, communications with low-cost and low-complexity devices, or combinations thereof. The wireless communications system 100 may provide for symbol alignment and power scaling for different length TTIs within predefined boundaries, such as boundaries of a slot of a subframe.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-$b$ may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f$307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). Various examples discussed herein provide techniques for shortened TTIs, which may provide TTI alignment within a slot and various power scaling techniques for one or more symbols transmitted in shortened TTIs.

Figure 2:
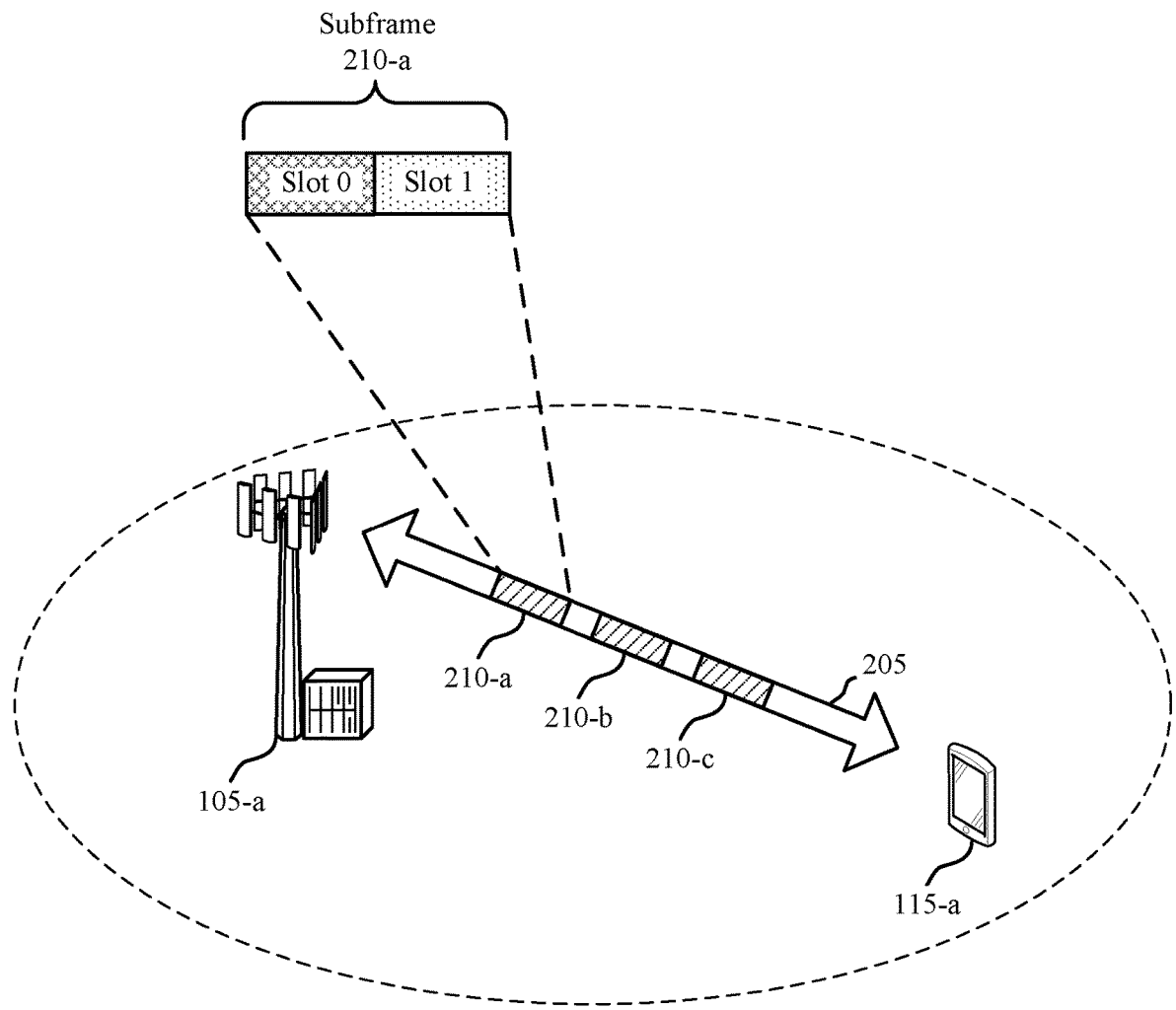
FIG. 2 illustrates an example of a portion of a wireless communication system that supports uplink transmission techniques in low latency wireless communication systems in accordance with aspects of the present disclosure.

FIG. 2 illustrates an example of a wireless communication system 200 for uplink transmission techniques in low latency wireless communication systems. Wireless communications system 200 includes base station 105-a and UE 115-a, which may be examples of aspects of a UE 115 as described above with reference to FIG. 1. In the example of FIG. 2, the wireless communication system 200 may operate according to a radio access technology (RAT) such as a 5G or NR RAT, although techniques described herein may be applied to any RAT and to systems that may concurrently use two or more different RATs.

Base station 105-a may communicate with UE 115-a over carrier 205. In some examples, base station 105-a may allocate resources for communication with legacy UEs over carrier 205. For example, base station 105-a may allocate subframes 210 for communication with UE, and one or more subframes 210 may correspond to a legacy LTE TTI of 1 ms. In this example, subframes 210 may include a first subframe 210-a, a second subframe 210-b, and a third subframe 210-c. Each of the subframes 210 may include two slots, similarly as discussed above, in which each slot may have seven symbols for a normal cyclic prefix. In this example, a first slot (slot 0) 220 and a second slot (slot 1) 225 may be included in the first subframe 210-a.

As indicated above, in the uplink of a low latency system, different sTTI lengths may be used for transmissions over carrier 205. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). While various examples discussed herein are described with respect to uplink communications, such techniques may also apply to downlink communications in various examples. When two-symbol sTTI is used, in some cases may be desirable to have a fixed sTTI structure in which sTTI boundaries lie within slot boundaries or are aligned with slot boundaries, such as the boundaries of the first slot 220 or second slot 225, which may be referred to as slot-aligned sTTIs. As discussed above, when using a normal CP, seven symbols are included in each slot 220-225, and thus each slot may include three sTTIs for slot-aligned sTTIs. In some cases, one of the sTTIs may be configured as a three-symbol TTI, so as to efficiently utilize each symbol of each slot. In such cases, different patterns can be considered, such as having the three-symbol TTI located at the end of a slot 220-225, or at the beginning of a slot 220-225.

Figure 3:
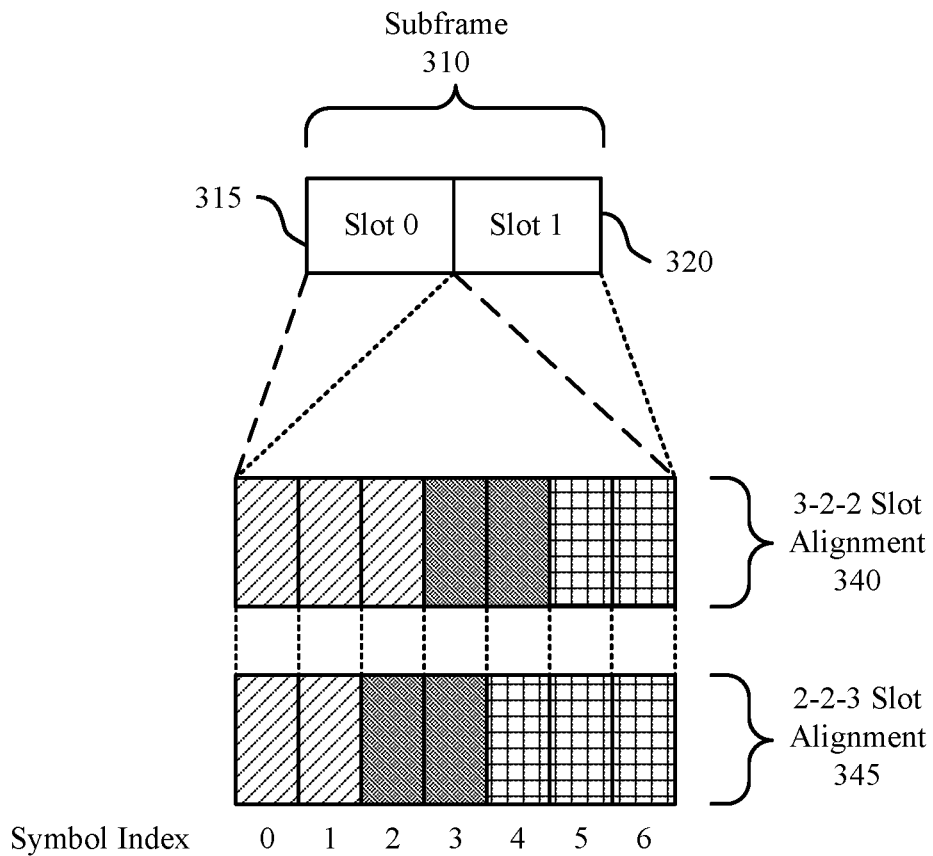
FIG. 3 illustrates an example of sTTI patterns for slot-aligned sTTIs that support uplink transmission techniques in low latency wireless communication systems in accordance with aspects of the present disclosure.

FIG. 3 illustrates an example of sTTI patterns 300 for slot-aligned sTTIs that support uplink transmission techniques in low latency wireless communication systems. Slot-aligned sTTI patterns 300 may be used for low latency communications between a UE and a base station such as discussed above with respect to FIGS. 1 and 2. A subframe 310 may have resources allocated for uplink communication. Subframe 310 may include two slots: first slot (slot 0) 315 and second slot (slot 1) 320 that may correspond to legacy LTE slots. Each slot 315 and 320 may include slot-aligned sTTIs allocated for low latency communication. Each slot 315 and 320 may include three sTTIs, including a first TTI (TTI-0) 325, a second TTI (TTI-1) and a third TTI (TTI-2) 335. In some examples, the TTIs 325 through 335 may be aligned in a 3-2-2 slot alignment 340, in which the first TTI 325 may include three symbols, the second TTI 330 may include two symbols, and the third TTI 335 may include two symbols. In other examples, the TTIs 325 through 335 may be aligned in a 2-2-3 slot alignment 345, in which the first TTI 325 may include two symbols, the second TTI 330 may include two symbols, and the third TTI 335 may include three symbols. Of course, other alignment patterns may be used for communications, and the 3-2-2 slot alignment 340 and the 2-2-3 slot alignment 345 are provided for purposes of illustration and discussion. Additionally, the first slot 315 may use a different slot alignment than the second slot 320. For example, each of the first slot 315 and the second slot 320 may use the 3-2-2 slot alignment 340 or may use the 2-2-3 slot alignment 345. Alternatively, the first slot 315 may use a 3-2-2 slot alignment 340 and the second slot may use the 2-2-3 slot alignment 345. Other combinations may be used as well, including combinations with different slot alignments.

In some examples, a base station may allocate uplink resources to a UE for uplink transmissions of subframe 310 that may include an allocation according to one or more slot alignments. When using different length TTIs 325 through 335, as compared to a two-symbol sTTI, a three-symbol sTTI may benefit from its better time diversity and higher achievable energy per bit. As a result, these two uplink transmissions may provide dissimilar coverages. In some examples, in order to provide both TTI durations that have similar performances, different power control formulae may be used for different length sTTIs. More specifically, in some examples, the performance loss of a two-symbol sTTI as compared to a three-symbol sTTI may be compensated for by adding an offset term in the uplink power control formula. Thus, a transmission power may be determined for the three-symbol sTTI, and an offset applied to the determined transmission power to determine the two-symbol sTTI transmission power. Such a power offset may be indicated to the UE via, for example, explicit signaling in an uplink UL grant. In other examples, such a power offset may be indicated using an implicit indication. For example, the power offset can be configured by higher layers, and whenever a UE is allocated a two-symbol sTTI, the transmission power may be offset by the given value. Such an indication may be configured semi-statically, for example, through RRC signaling or through system information block (SIB) signaling.

Figure 4A:
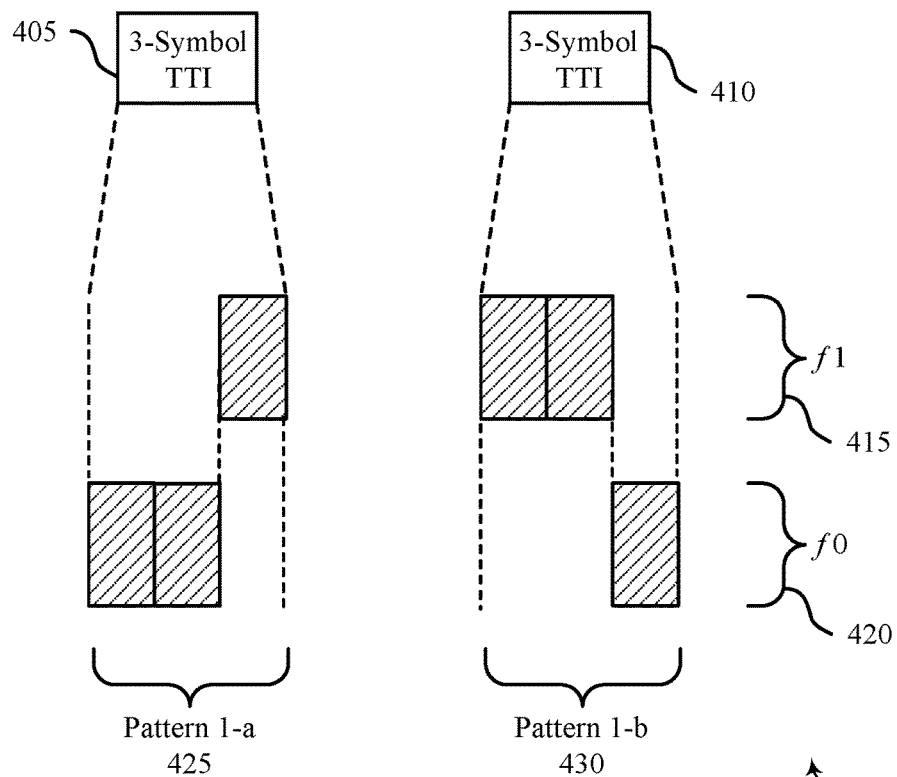
FIG. 4A and FIG. 4B illustrate examples of sTTI frequency hopping patterns that support uplink transmission techniques in low latency wireless communication systems in accordance with aspects of the present disclosure.
Figure 4B:
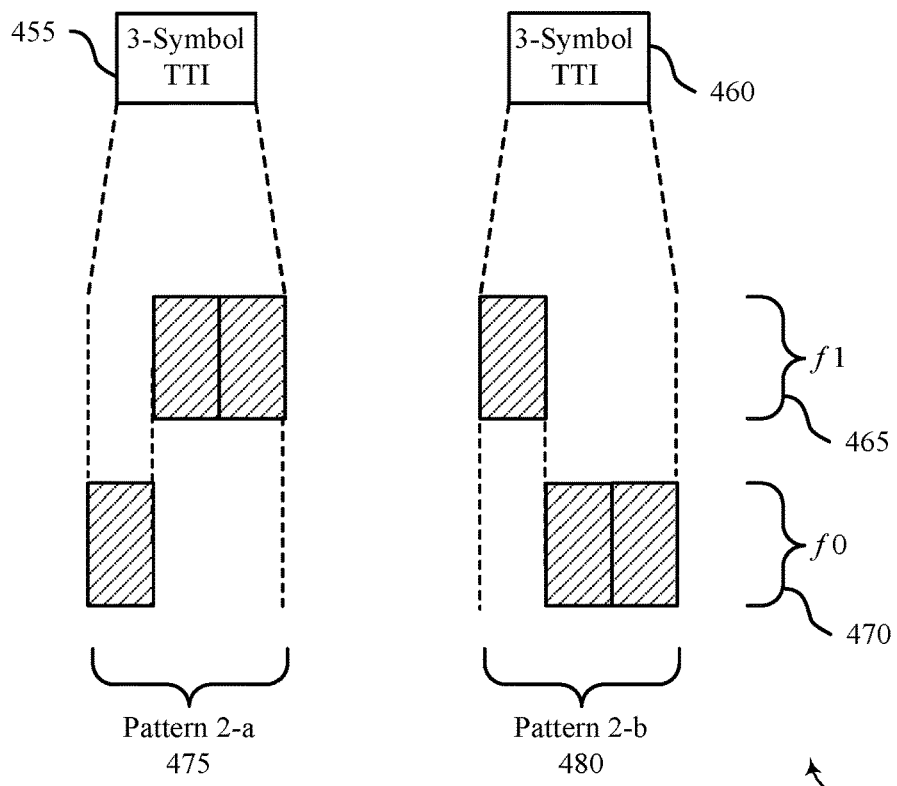

FIG. 4A and FIG. 4B illustrate examples of sTTI frequency hopping patterns 400 and 450 for uplink transmissions in low latency wireless communication systems. Frequency hopping patterns 400 and 450 may be used for low latency communications between a UE and a base station such as discussed above with respect to FIGS. 1 and 2.

In one example of FIG. 4A, a three-symbol TTI 405 may have an initial two symbols transmitted using a first frequency resource (f 0) 420 and the third symbol transmitted using a second frequency resource (f 1) 425, according to a first hopping pattern (pattern 1-a) 425. In another example of FIG. 4A, a three-symbol TTI 410 may have an initial two symbols transmitted using the second frequency resource (f 1) 425 and the third symbol transmitted using the first frequency resource (f 0) 420, according to a second hopping pattern (pattern 1-b) 430.

Similarly, in one example of FIG. 4B, a three-symbol TTI 455 may have an initial symbols transmitted using a first frequency resource (f 0) 460 and the subsequent two symbols transmitted using a second frequency resource (f 1) 465, according to a third hopping pattern (pattern 2-a) 475. In another example of FIG. 4B, a three-symbol TTI 460 may have an initial symbol transmitted using the second frequency resource (f 1) 465 and the subsequent two symbols transmitted using the first frequency resource (f 0) 470, according to a fourth hopping pattern (pattern 2-*b*) 480.

In cases where a two-symbol sTTI is transmitted, each transmitted symbol may include both pilot signal and data transmissions. For the three-symbol TTIs 405, 410, 455, and 460 of FIGS. 4A and 4B, the two symbols that are transmitted using a same frequency resource may include data in one symbol and a pilot signal in the other symbol, with the third symbol that is transmitted in the different frequency resource including both data and pilot signal transmissions. Each of the portions of the sTTIs that are transmitted using different frequency resources may be independently decodable.

In some examples, the alignment of two-symbol sTTIs versus three symbol sTTIs, as well as the frequency hopping pattern used, may be selected based on one or more factors associated with a transmission or with a transmitting device. For example, in some cases a three-symbol sTTI may be configured at the beginning of a subframe using frequency hopping pattern 1*a* or 1*b*, and a three-symbol sTTI may be configured at the end of a subframe using frequency hopping pattern 2*a* or 2*b*. One reason for the former case may be that, in some cases, the first symbol of a subframe may not be used for transmissions, and instead may be empty (e.g., in eMTC, when the transmission band changes, the first symbol of a subframe may not be used and the associated time interval used for some processing). One reason for the latter case may be that when a sounding reference signal (SRS) needs to be transmitted, the last symbol of a subframe is not used for sPUCCH transmissions. In both of these cases, a three-symbol sTTI effectively becomes a two-symbol sTTI, and a two-symbol sTTI design may be used over the first and/or the last sTTI of a subframe in such examples (e.g., each of the two symbols conveys data and pilot signal transmissions).

In some examples, power scaling may be used within a three-symbol sTTI with frequency hopping. When frequency hopping is employed, the two-symbols of a three-symbol sTTI that use a same frequency resource may benefit from more time diversity as compared to a single-symbol portion on a different frequency resource. Because the two parts may be independently decodable, it may be desirable to make sure that both provide a similar level of coverage. In some examples, distinct power control formulae may be used for each portion to provide similar coverages. More specifically, in some examples, the uplink transmission power of the single-symbol portion may be boosted by adding a power offset to its power control formula relative to the transmission power for the two-symbol portion. Thus, a transmission power may be determined for the two-symbol portion of the sTTI that use a same frequency resource, and an offset applied to the determined transmission power to determine the transmission power for the remaining symbol that uses the different frequency resource. Such a power offset may be indicated to the UE via, for example, explicit signaling in an UL grant. In other examples, such a power offset may be indicated using an implicit indication. For example, the power offset can be configured by higher layers, and whenever a UE is allocated a three-symbol sTTI with frequency hopping, the transmission power for the symbol that uses a different frequency resource than two other symbols may be offset by the given value. Such an indication may be configured semi-statically, for example, through RRC signaling or through system information block (SIB) signaling. In other examples, a same uplink transmission may be used for symbols transmitted using different frequency resources. In cases where the first symbol or the last symbol of a three-symbol sTTI is reserved for other communications (e.g., not used to provide processing time or used for SRS transmission) power scaling may not be implemented, because such a three-symbol sTTI effectively becomes a normal two-symbol sTTI and both symbols can be transmitted with an equal power.

Figure 5:
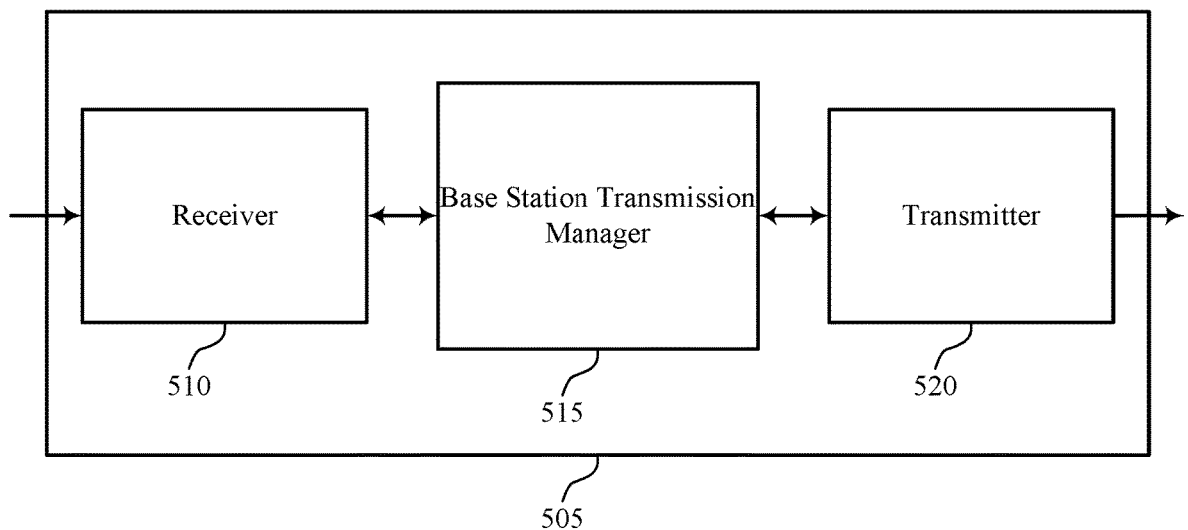
FIGS. 5 through 7 show block diagrams of a device that supports uplink transmission techniques in low latency wireless communication systems in accordance with aspects of the present disclosure.

FIG. 5 shows a block diagram 500 of a wireless device 505 that supports uplink transmission techniques in low latency wireless communication systems in accordance with various aspects of the present disclosure. Wireless device 505 may be an example of aspects of a base station 105 as described with reference to FIG. 1. Wireless device 505 may include receiver 510, base station transmission manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to uplink transmission techniques in low latency wireless communication systems, etc.). Information may be passed on to other components of the device. The receiver 510 may be an example of aspects of the transceiver 835 described with reference to FIG. 8.

Base station transmission manager 515 may be an example of aspects of the base station transmission manager 815 described with reference to FIG. 8. Base station transmission manager 515 may identify uplink resources for an uplink transmission that span two or more TTIs including a first TTI that has a different number of OFDM symbols than a second TTI, determine a first transmission power for the first TTI, apply a power offset to the first transmission power to determine a second transmission power for the second TTI, and transmit an uplink grant for the uplink transmission to a UE. The uplink grant may include an indication of the uplink resources and one or more of the first transmission power or the second transmission power. The base station transmission manager 515 may also identify resources for a first uplink TTI that has three OFDM symbols, allocate a first frequency resource for transmission of a first subset of the OFDM symbols, allocate a second frequency resource for transmission of a second subset of the OFDM symbols, the second frequency resource being different than the first frequency resource, and transmit an uplink grant for the first uplink TTI to a UE. Such an uplink grant may include an indication of the first frequency resource and the second frequency resource.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
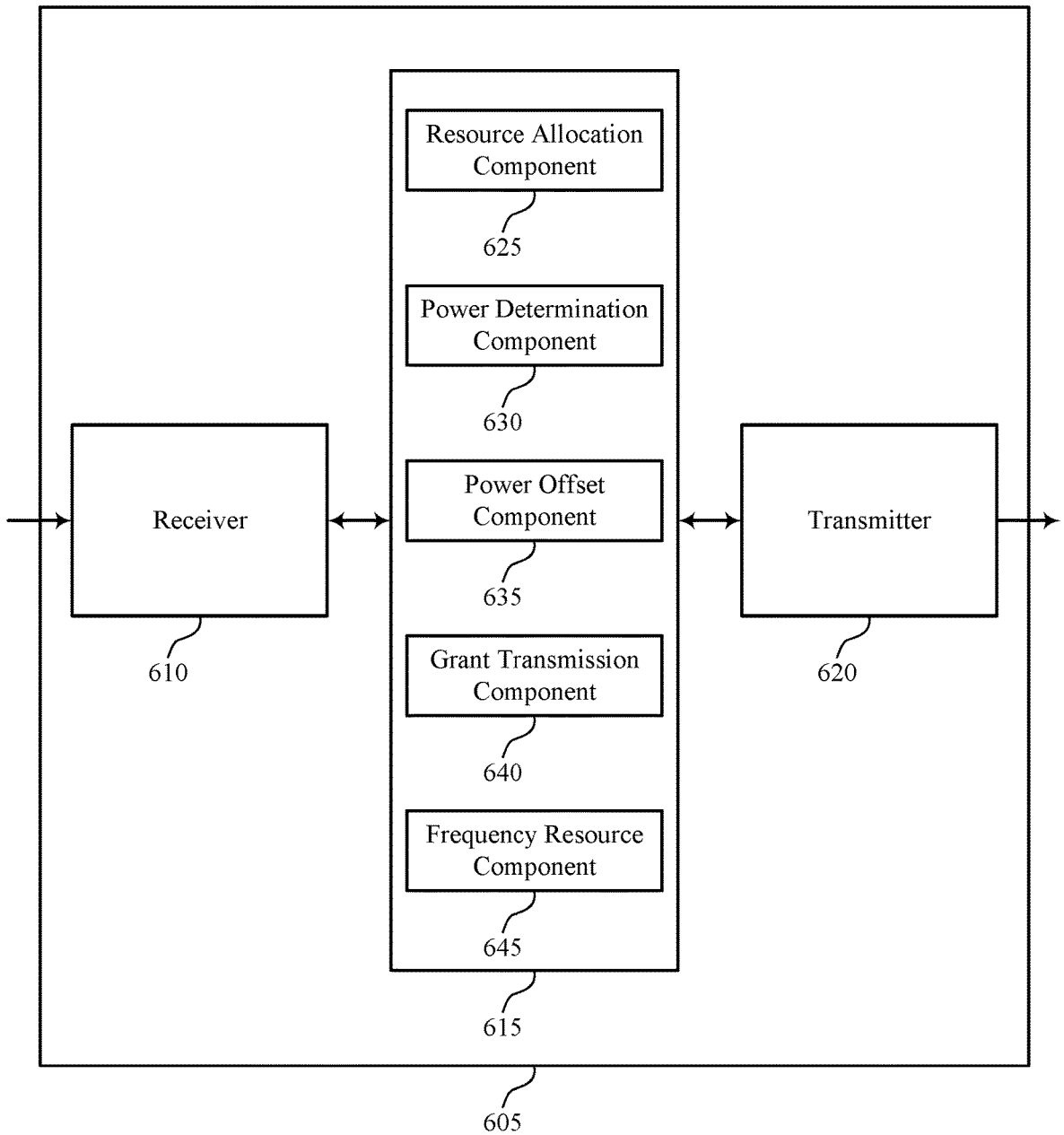

FIG. 6 shows a block diagram 600 of a wireless device 605 that supports uplink transmission techniques in low latency wireless communication systems in accordance with various aspects of the present disclosure. Wireless device 605 may be an example of aspects of a wireless device 505 or a base station 105 as described with reference to FIGS. 1 and 5. Wireless device 605 may include receiver 610, base station transmission manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink transmission techniques in low latency wireless communication systems, etc.). Information may be passed on to other components of the device. The receiver 610 may be an example of aspects of the transceiver 835 described with reference to FIG. 8.

Base station transmission manager 615 may be an example of aspects of the base station transmission manager 815 described with reference to FIG. 8. Base station transmission manager 615 may also include resource allocation component 625, power determination component 630, power offset component 635, grant transmission component 640, and frequency resource component 645.

Resource allocation component 625 may identify uplink resources for an uplink transmission that spans two or more TTIs including a first TTI that has a different number of OFDM symbols than a second TTI. For example, resource allocation component 625 may identify that the first TTI that has three OFDM symbols and the second TTI that has two OFDM symbols, and identify resources for a first uplink TTI that has three OFDM symbols. In some cases, resource allocation component 625 may determine that a first subset of the OFDM symbols are to be transmitted at a beginning of a wireless transmission subframe, and configure the first subset of the OFDM symbols to have two OFDM symbols, or may determine that a second subset of the OFDM symbols are to be transmitted at an end of a wireless transmission subframe and configure the second subset of the OFDM symbols to have two OFDM symbols. In some cases, the two or more TTIs are allocated uplink resources located within a slot of a wireless transmission subframe. In some cases, the first subset of the OFDM symbols has two OFDM symbols and the second subset of the OFDM symbols has one OFDM symbol.

Power determination component 630 may determine a first transmission power for the first TTI. Power determination component 630 also may determine a first transmission power for the first subset of the OFDM symbols, the first subset having two OFDM symbols.

Power offset component 635 may apply a power offset to the first transmission power to determine a second transmission power for the second TTI, and transmit the power offset to the UE. In some cases, power offset component 635 may apply a power offset to the first transmission power to determine a second transmission power for a second subset of the OFDM symbols within a three-symbol TTI, the second subset having one OFDM symbol. In some cases, the power offset increases a transmission power for the second TTI, or the second subset of OFDM symbols, to compensate for reduced time diversity and achievable energy per bit relative to the first TTI or first subset of OFDM symbols.

Grant transmission component 640 may transmit an uplink grant for the uplink transmission to a UE, the uplink grant including an indication of the uplink resources and one or more of the first transmission power or the second transmission power. In some cases, grant transmission component 640 may transmit an uplink grant for the first uplink TTI to a UE, the uplink grant including an indication of a first frequency resource and a second frequency resource for symbols of the uplink TTI. In some cases, the power offset is transmitted in the uplink grant.

Frequency resource component 645 may allocate a first frequency resource for transmission of a first subset of the OFDM symbols and allocate a second frequency resource for transmission of a second subset of the OFDM symbols, the second frequency resource being different than the first frequency resource.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
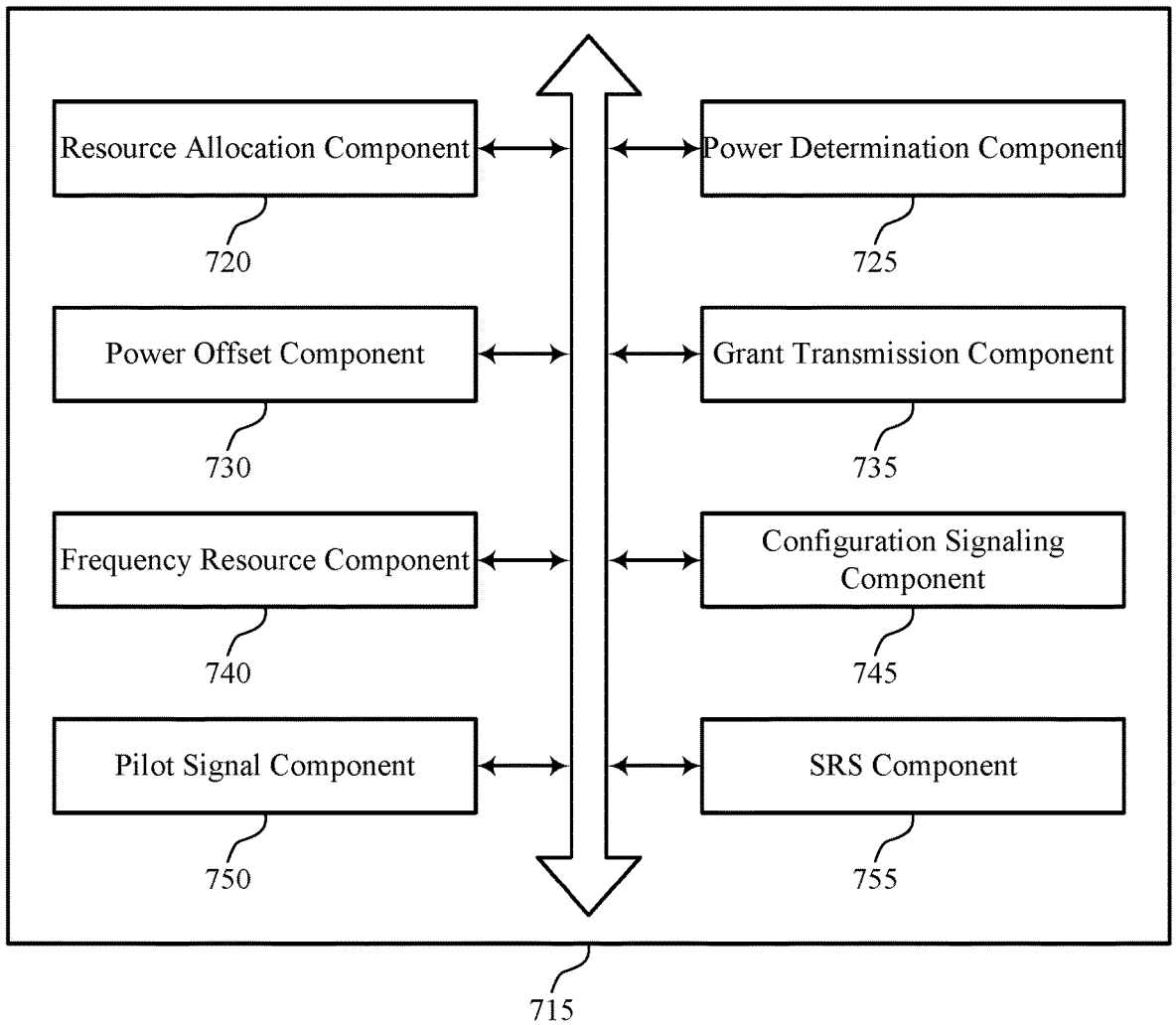

FIG. 7 shows a block diagram 700 of a base station transmission manager 715 that supports uplink transmission techniques in low latency wireless communication systems in accordance with various aspects of the present disclosure. The base station transmission manager 715 may be an example of aspects of a base station transmission manager 515, a base station transmission manager 615, or a base station transmission manager 815 described with reference to FIGS. 5, 6, and 8. The base station transmission manager 715 may include resource allocation component 720, power determination component 725, power offset component 730, grant transmission component 735, frequency resource component 740, configuration signaling component 745, pilot signal component 750, and sounding reference signal (SRS) component 755. Each of these modules may communicate, directly or indirectly, with one another (e.g., via one or more buses).

Resource allocation component 720 may identify uplink resources for an uplink transmission that span two or more TTIs including a first TTI that has a different number of OFDM symbols than a second TTI. In some examples, the first TTI may have three OFDM symbols and the second TTI may have two OFDM symbols. In some cases, the first uplink TTI that has three OFDM symbols and resource allocation component 720 may determine that the first subset of the OFDM symbols are to be transmitted at a beginning of a wireless transmission subframe and configure the first subset of the OFDM symbols to have two OFDM symbols that are to be transmitted using a first frequency resource. In some cases, resource allocation component 720 may determine that a second subset of the OFDM symbols are to be transmitted at an end of a wireless transmission subframe, and may configure the second subset of the OFDM symbols to have two OFDM symbols. In some cases, the two or more TTIs are allocated uplink resources located within a slot of a wireless transmission subframe. In some cases, the first subset of the OFDM symbols has two OFDM symbols and the second subset of the OFDM symbols has one OFDM symbol.

Power determination component 725 may determine a first transmission power for the first TTI and determine a first transmission power for the first subset of the OFDM symbols.

Power offset component 730 may apply a power offset to the first transmission power to determine a second transmission power for the second TTI, and transmit the power offset to the UE. In some cases, power offset component 730 may apply a power offset to the first transmission power to determine a second transmission power for a second subset of OFDM symbols of a three-symbol TTI. In some cases, the power offset increases a transmission power to compensate for reduced time diversity and achievable energy per bit.

Grant transmission component 735 may transmit an uplink grant for the uplink transmission to a UE, the uplink grant including an indication of the uplink resources and one or more of the first transmission power or the second transmission power and transmit an uplink grant for the first uplink TTI to a UE. The uplink grant also may include an indication of the first frequency resource and the second frequency resource. In some cases, the power offset is transmitted in the uplink grant.

Frequency resource component 740 may allocate a first frequency resource for transmission of a first subset of the OFDM symbols and allocate a second frequency resource for transmission of a second subset of the OFDM symbols, the second frequency resource being different than the first frequency resource.

Configuration signaling component 745 may configure the UE with the power offset prior to the identifying resources for the uplink transmission and configure the UE with the power offset prior to the identifying resources for the first uplink TTI.

Pilot signal component 750 may configure a first OFDM symbol of a first subset of the OFDM symbols for data transmission and a second OFDM symbol of the first subset of the OFDM symbols for a pilot signal transmission, and configure the one OFDM symbol of the second subset of the OFDM symbols for transmission of both data and a pilot signal. In some cases, pilot signal component 750 may determine that a first OFDM symbol of the first subset of the OFDM symbols is located at the beginning of the wireless transmission subframe and is to be unused for data or pilot signal transmissions, and configure a second OFDM symbol of the first subset of the OFDM symbols for transmission of both data and a pilot signal. SRS component 755 may determine that a last OFDM symbol of the second subset of the OFDM symbols is located at the end of the wireless transmission subframe and is to be used for a SRS transmissions.

Figure 8:
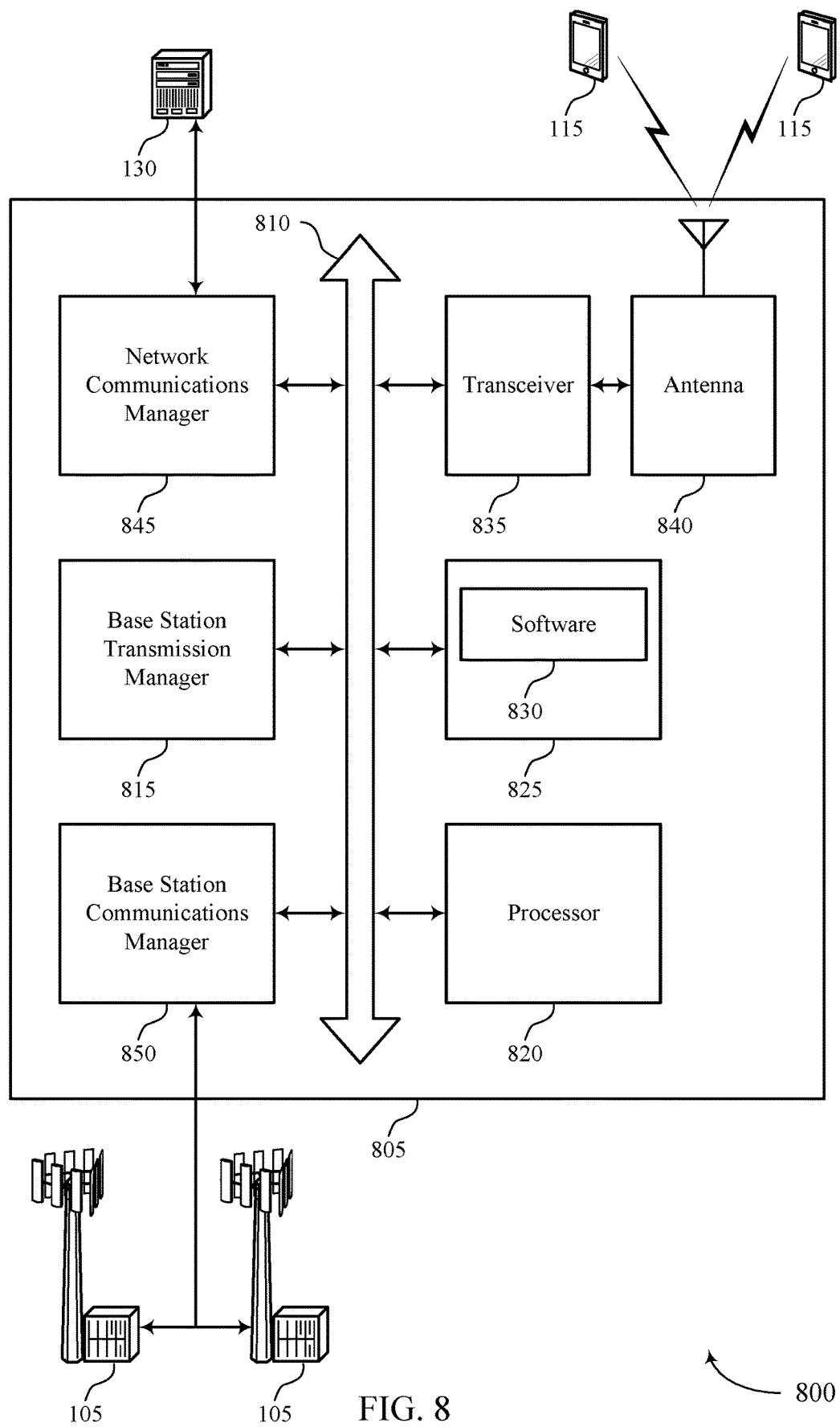
FIG. 8 illustrates a block diagram of a system including a base station that supports uplink transmission techniques in low latency wireless communication systems in accordance with aspects of the present disclosure.

FIG. 8 shows a diagram of a system 800 including a device 805 that supports uplink transmission techniques in low latency wireless communication systems in accordance with various aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station transmission manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting uplink transmission techniques in low latency wireless communication systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support uplink transmission techniques in low latency wireless communication systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an Long Term Evolution (LTE)/LTE-A wireless communication network technology to provide communication between base stations 105.

Figure 9:
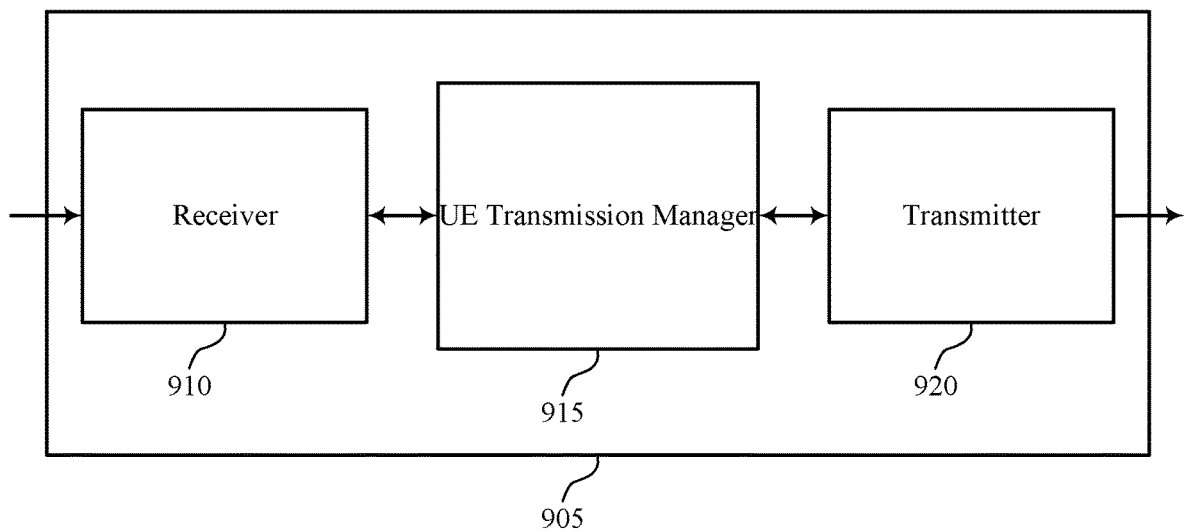
FIGS. 9 through 11 show block diagrams of a device that supports uplink transmission techniques in low latency wireless communication systems in accordance with aspects of the present disclosure.

FIG. 9 shows a block diagram 900 of a wireless device 905 that supports uplink transmission techniques in low latency wireless communication systems in accordance with various aspects of the present disclosure. Wireless device 905 may be an example of aspects of a UE 115 as described with reference to FIG. 1. Wireless device 905 may include receiver 910, UE transmission manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink transmission techniques in low latency wireless communication systems, etc.). Information may be passed on to other components of the device. The receiver 910 may be an example of aspects of the transceiver 1235 described with reference to FIG. 12.

UE transmission manager 915 may be an example of aspects of the UE transmission manager 1215 described with reference to FIG. 12. UE transmission manager 915 may receive an uplink resource allocation from a base station for an uplink transmission, the uplink resource allocation identifying uplink resources that span two or more TTIs including a first TTI and a second TTI that have different numbers of OFDM symbols, identify a first uplink transmission power for the first TTI, apply a power offset to the first uplink transmission power to determine a second uplink transmission power for the second TTI, and transmit the uplink transmission based on the first uplink transmission power and the second uplink transmission power. The UE transmission manager 915 may also receive an uplink resource allocation from a base station for an uplink transmission, the uplink resource allocation identifying an uplink TTI that has three OFDM symbols, identify a first frequency resource for transmitting a first subset of the OFDM symbols based on the uplink resource allocation, identify a second frequency resource for transmitting a second subset of the OFDM symbols based on the uplink resource allocation, and transmit the uplink transmission using the first frequency resource and the second frequency resource.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
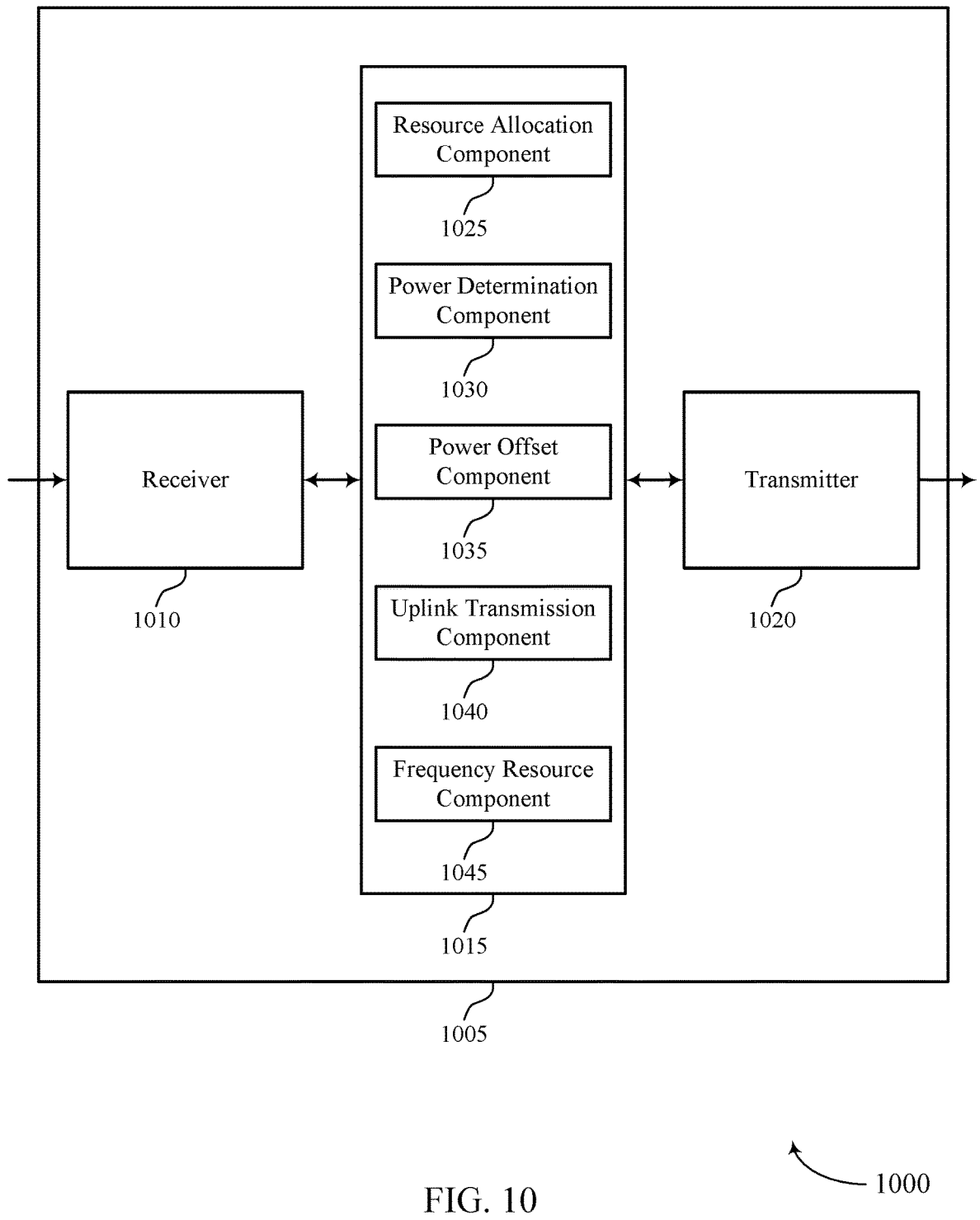

FIG. 10 shows a block diagram 1000 of a wireless device 1005 that supports uplink transmission techniques in low latency wireless communication systems in accordance with various aspects of the present disclosure. Wireless device 1005 may be an example of aspects of a wireless device 905 or a UE 115 as described with reference to FIGS. 1 and 9. Wireless device 1005 may include receiver 1010, UE transmission manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink transmission techniques in low latency wireless communication systems, etc.). Information may be passed on to other components of the device. The receiver 1010 may be an example of aspects of the transceiver 1235 described with reference to FIG. 12.

UE transmission manager 1015 may be an example of aspects of the UE transmission manager 1215 described with reference to FIG. 12. UE transmission manager 1015 may also include resource allocation component 1025, power determination component 1030, power offset component 1035, uplink transmission component 1040, and frequency resource component 1045.

Resource allocation component 1025 may receive an uplink resource allocation from a base station for an uplink transmission, the uplink resource allocation identifying uplink resources that span two or more TTIs including a first TTI and a second TTI that have different numbers of OFDM symbols, identify that the first TTI that has three OFDM symbols and the second TTI that has two OFDM symbols, and receive the power offset with the uplink resource allocation. In some cases, the power offset is received in the uplink resource allocation. In some cases, the two or more TTIs are allocated uplink resources located within a slot of a wireless transmission subframe. In some cases, the first subset of the OFDM symbols has two OFDM symbols and the second subset of the OFDM symbols has one OFDM symbol. In some cases, the first subset of the OFDM symbols are to be transmitted at a beginning of a wireless transmission subframe. In some cases, a first OFDM symbol of the first subset of the OFDM symbols is located at the beginning of the wireless transmission subframe and is unallocated for data or pilot signal transmissions, and a second OFDM symbol of the first subset of the OFDM symbols is allocated for transmission of both data and a pilot signal. In some cases, the second subset of the OFDM symbols are to be transmitted at an end of a wireless transmission subframe, and the second subset of the OFDM symbols has two OFDM symbols.

Power determination component 1030 may identify a first uplink transmission power for the first TTI and identify a first transmission power for the first subset of the OFDM symbols, the first subset having two OFDM symbols.

Power offset component 1035 may apply a power offset to the first uplink transmission power to determine a second uplink transmission power for the second TTI, or apply a power offset to the first transmission power to determine a second transmission power for a second subset of the OFDM symbols, the second subset having one OFDM symbol. In some cases, the power offset increases a transmission power for the second TTI or second subset of the OFDM symbols to compensate for reduced time diversity and achievable energy per bit of the second TTI relative to the first TTI or first subset of OFDM symbols.

Uplink transmission component 1040 may transmit the uplink transmission based on the first uplink transmission power and the second uplink transmission power and transmit the uplink transmission using the first frequency resource and the second frequency resource. Frequency resource component 1045 may identify a first frequency resource for transmitting a first subset of the OFDM symbols based on the uplink resource allocation and identify a second frequency resource for transmitting a second subset of the OFDM symbols based on the uplink resource allocation.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
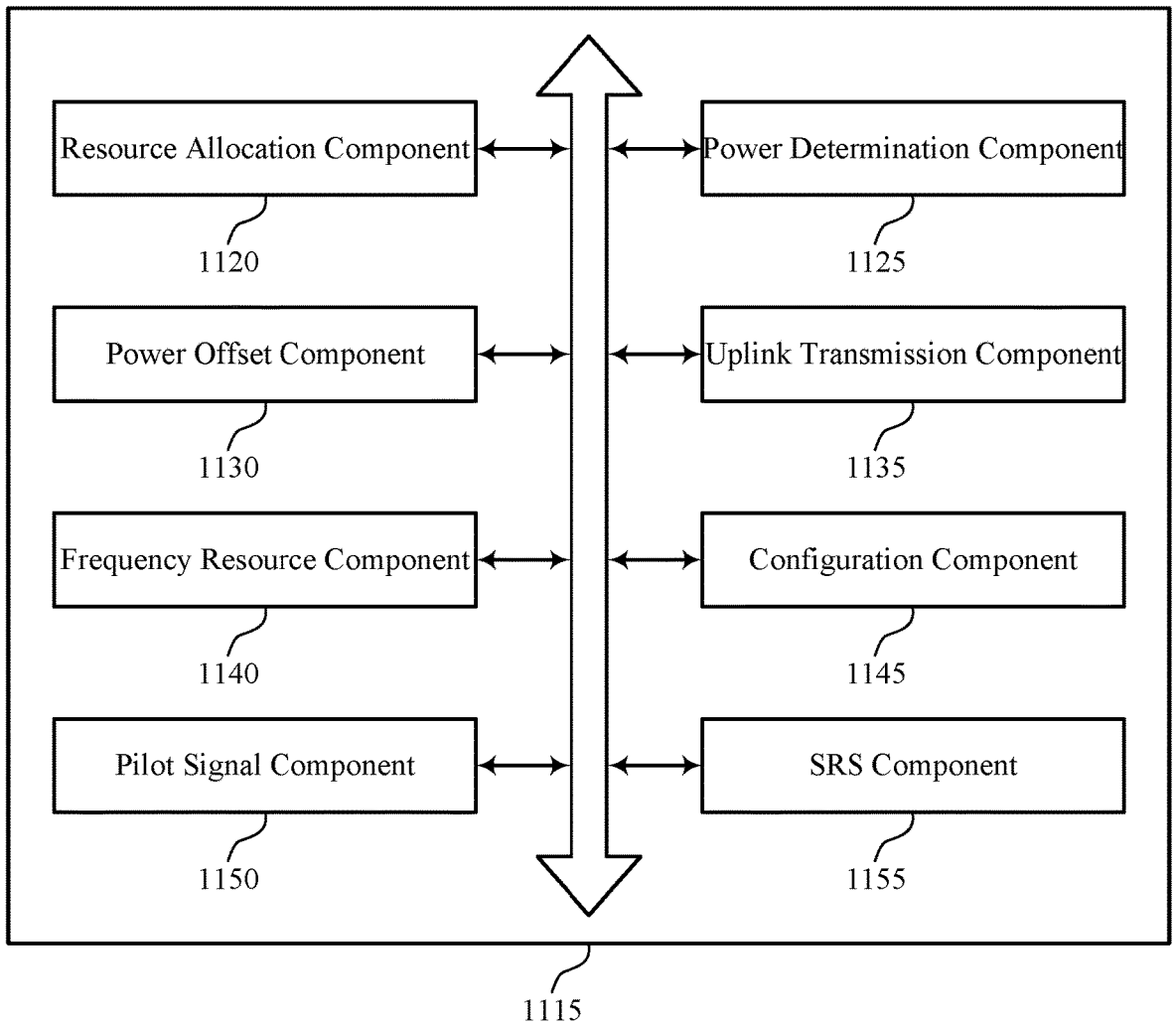

FIG. 11 shows a block diagram 1100 of a UE transmission manager 1115 that supports uplink transmission techniques in low latency wireless communication systems in accordance with various aspects of the present disclosure. The UE transmission manager 1115 may be an example of aspects of a UE transmission manager 1215 described with reference to FIGS. 9, 10, and 12. The UE transmission manager 1115 may include resource allocation component 1120, power determination component 1125, power offset component 1130, uplink transmission component 1135, frequency resource component 1140, configuration component 1145, pilot signal component 1150, and SRS component 1155. Each of these modules may communicate, directly or indirectly, with one another (e.g., via one or more buses).

Resource allocation component 1120 may receive an uplink resource allocation from a base station for an uplink transmission, the uplink resource allocation identifying uplink resources that span two or more TTIs including a first TTI and a second TTI that have different numbers of OFDM symbols, identify that the first TTI that has three OFDM symbols and the second TTI that has two OFDM symbols, and receive the power offset with the uplink resource allocation. In some cases, the power offset is received in the uplink resource allocation. In some cases, the two or more TTIs are allocated uplink resources located within a slot of a wireless transmission subframe. In some cases, the first subset of the OFDM symbols has two OFDM symbols and the second subset of the OFDM symbols has one OFDM symbol. In some cases, the first subset of the OFDM symbols are to be transmitted at a beginning of a wireless transmission subframe. In some cases, a first OFDM symbol of the first subset of the OFDM symbols is located at the beginning of the wireless transmission subframe and is unallocated for data or pilot signal transmissions, and a second OFDM symbol of the first subset of the OFDM symbols is allocated for transmission of both data and a pilot signal. In some cases, the second subset of the OFDM symbols are to be transmitted at an end of a wireless transmission subframe, and the second subset of the OFDM symbols has two OFDM symbols.

Power determination component 1125 may identify a first uplink transmission power for the first TTI and identify a first transmission power for the first subset of the OFDM symbols, the first subset having two OFDM symbols.

Power offset component 1130 may apply a power offset to the first uplink transmission power to determine a second uplink transmission power for the second TTI, or apply a power offset to the first transmission power to determine a second transmission power for a second subset of the OFDM symbols, the second subset having one OFDM symbol. In some cases, the power offset increases a transmission power for the second TTI or second subset of the OFDM symbols to compensate for reduced time diversity and achievable energy per bit of the second TTI relative to the first TTI or first subset of OFDM symbols.

Uplink transmission component 1135 may transmit the uplink transmission based on the first uplink transmission power and the second uplink transmission power and transmit the uplink transmission using the first frequency resource and the second frequency resource.

Frequency resource component 1140 may identify a first frequency resource for transmitting a first subset of the OFDM symbols based on the uplink resource allocation and identify a second frequency resource for transmitting a second subset of the OFDM symbols based on the uplink resource allocation.

Configuration component 1145 may receive, prior to receiving the uplink resource allocation, a configuration that identifies the power offset and receive, prior to the receiving the uplink resource allocation, a configuration with the power offset.

Pilot signal component 1150 may configure a first OFDM symbol of the first subset of the OFDM symbols for data transmission and a second OFDM symbol of the first subset of the OFDM symbols for a pilot signal transmission and configure the one OFDM symbol of the second subset of the OFDM symbols for transmission of both data and a pilot signal.

SRS component 1155 may determine a last OFDM symbol of the second subset of the OFDM symbols is located at the end of the wireless transmission subframe and is configured for a SRS transmission, and where a first OFDM symbol of the second subset of the OFDM symbols that precedes the last OFDM symbol is allocated for transmission of both data and a pilot signal.

Figure 12:
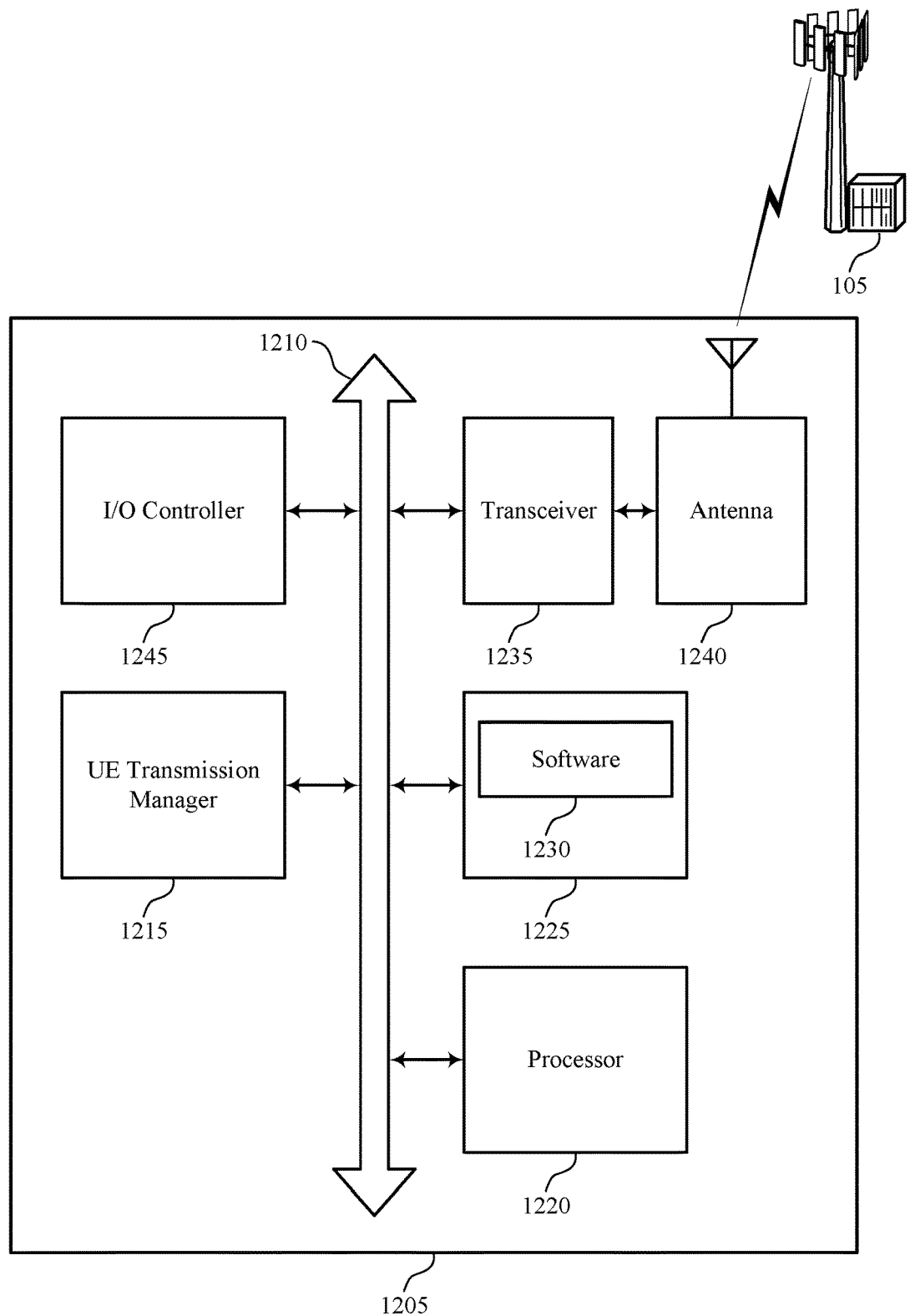
FIG. 12 illustrates a block diagram of a system including a UE that supports uplink transmission techniques in low latency wireless communication systems in accordance with aspects of the present disclosure.

FIG. 12 shows a diagram of a system 1200 including a device 1205 that supports uplink transmission techniques in low latency wireless communication systems in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE transmission manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink transmission techniques in low latency wireless communication systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support uplink transmission techniques in low latency wireless communication systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
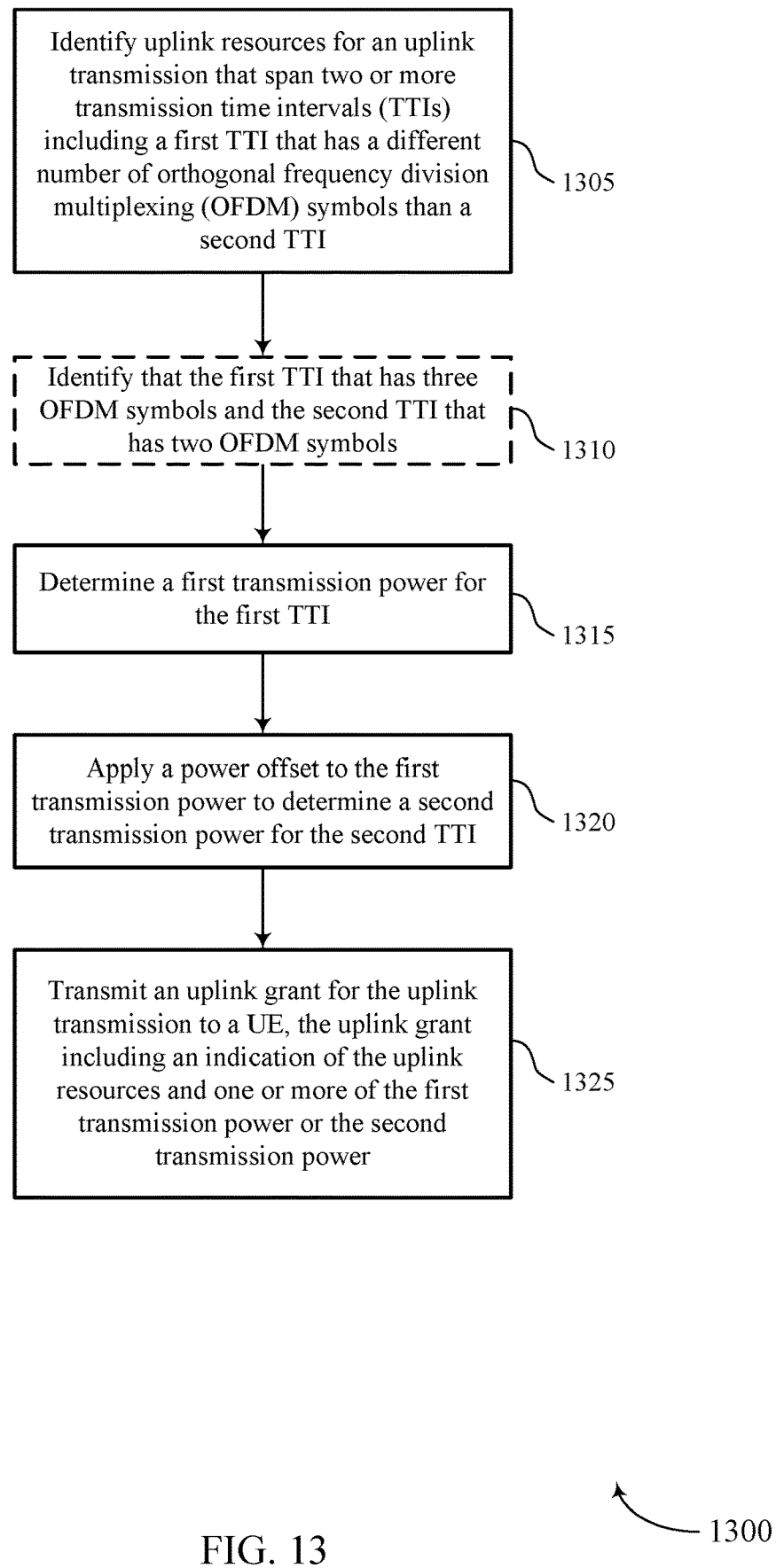
FIGS. 13 through 18 illustrate methods for uplink transmission techniques in low latency wireless communication systems in accordance with aspects of the present disclosure.

FIG. 13 shows a flowchart illustrating a method 1300 for uplink transmission techniques in low latency wireless communication systems in accordance with various aspects of the present disclosure. The operations of method 1300 may be implemented by a base station 105 or its components as described herein. For example, the operations of method 1300 may be performed by a base station transmission manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may identify uplink resources for an uplink transmission that span two or more transmission time intervals (TTIs) including a first TTI that has a different number of orthogonal frequency division multiplexing (OFDM) symbols than a second TTI. The operations of block 1305 may be performed according to the methods described with reference to FIGS. 1 through 4. In certain examples, aspects of the operations of block 1305 may be performed by a resource allocation component as described with reference to FIGS. 5 through 8.

At optional block 1310 the base station 105 may identify that the first TTI that has three OFDM symbols and the second TTI that has two OFDM symbols. The operations of block 1310 may be performed according to the methods described with reference to FIGS. 1 through 4. In certain examples, aspects of the operations of block 1310 may be performed by a resource allocation component as described with reference to FIGS. 5 through 8.

At block 1315 the base station 105 may determine a first transmission power for the first TTI. The operations of block 1315 may be performed according to the methods described with reference to FIGS. 1 through 4. In certain examples, aspects of the operations of block 1315 may be performed by a power determination component as described with reference to FIGS. 5 through 8.

At block 1320 the base station 105 may apply a power offset to the first transmission power to determine a second transmission power for the second TTI. The operations of block 1320 may be performed according to the methods described with reference to FIGS. 1 through 4. In certain examples, aspects of the operations of block 1320 may be performed by a power offset component as described with reference to FIGS. 5 through 8.

At block 1325 the base station 105 may transmit an uplink grant for the uplink transmission to a user equipment (UE), the uplink grant including an indication of the uplink resources and one or more of the first transmission power or the second transmission power. The operations of block 1325 may be performed according to the methods described with reference to FIGS. 1 through 4. In certain examples, aspects of the operations of block 1325 may be performed by a grant transmission component as described with reference to FIGS. 5 through 8.

Figure 14:
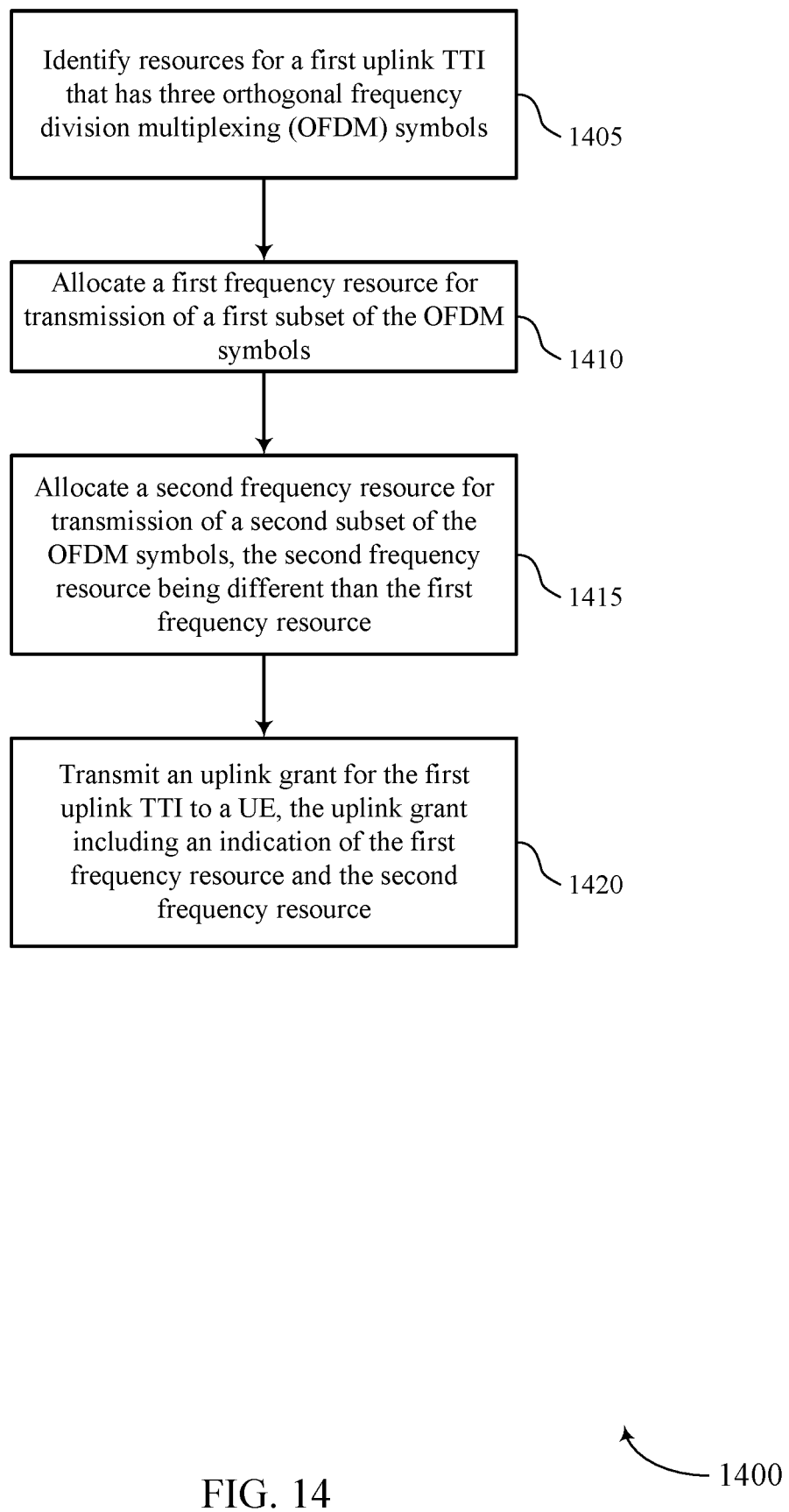

FIG. 14 shows a flowchart illustrating a method 1400 for uplink transmission techniques in low latency wireless communication systems in accordance with various aspects of the present disclosure. The operations of method 1400 may be implemented by a base station 105 or its components as described herein. For example, the operations of method 1400 may be performed by a base station transmission manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may identify resources for a first uplink TTI that has three OFDM symbols. The operations of block 1405 may be performed according to the methods described with reference to FIGS. 1 through 4. In certain examples, aspects of the operations of block 1405 may be performed by a resource allocation component as described with reference to FIGS. 5 through 8.

At block 1410 the base station 105 may allocate a first frequency resource for transmission of a first subset of the OFDM symbols. The operations of block 1410 may be performed according to the methods described with reference to FIGS. 1 through 4. In certain examples, aspects of the operations of block 1410 may be performed by a frequency resource component as described with reference to FIGS. 5 through 8.

At block 1415 the base station 105 may allocate a second frequency resource for transmission of a second subset of the OFDM symbols, the second frequency resource being different than the first frequency resource. The operations of block 1415 may be performed according to the methods described with reference to FIGS. 1 through 4. In certain examples, aspects of the operations of block 1415 may be performed by a frequency resource component as described with reference to FIGS. 5 through 8.

At block 1420 the base station 105 may transmit an uplink grant for the first uplink TTI to a user equipment (UE), the uplink grant including an indication of the first frequency resource and the second frequency resource. The operations of block 1420 may be performed according to the methods described with reference to FIGS. 1 through 4. In certain examples, aspects of the operations of block 1420 may be performed by a grant transmission component as described with reference to FIGS. 5 through 8.

Figure 15:
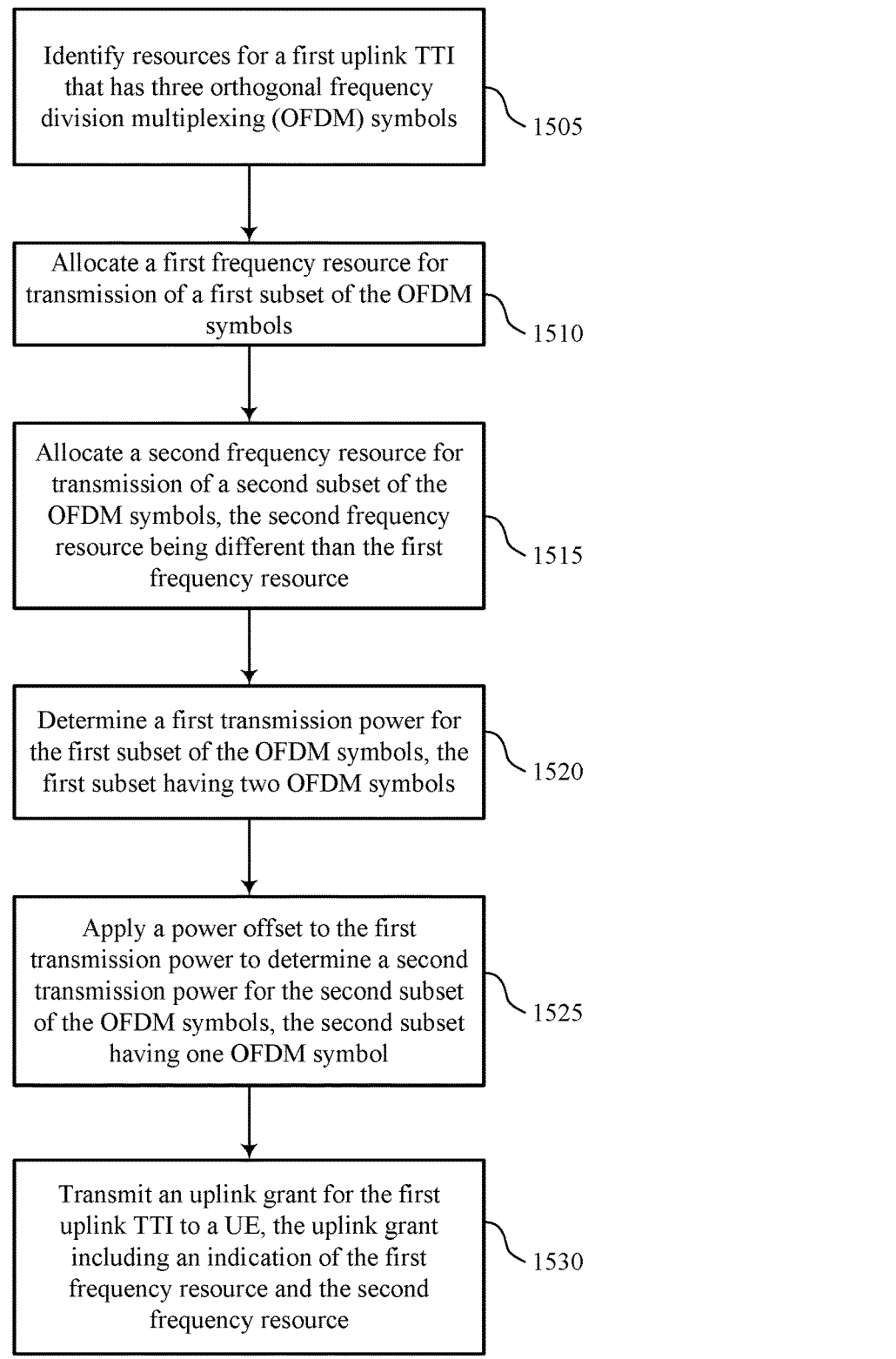

FIG. 15 shows a flowchart illustrating a method 1500 for uplink transmission techniques in low latency wireless communication systems in accordance with various aspects of the present disclosure. The operations of method 1500 may be implemented by a base station 105 or its components as described herein. For example, the operations of method 1500 may be performed by a base station transmission manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may identify resources for a first uplink transmission time interval (TTI) that has three orthogonal frequency division multiplexing (OFDM) symbols. The operations of block 1505 may be performed according to the methods described with reference to FIGS. 1 through 4. In certain examples, aspects of the operations of block 1505 may be performed by a resource allocation component as described with reference to FIGS. 5 through 8.

At block 1510 the base station 105 may allocate a first frequency resource for transmission of a first subset of the OFDM symbols. The operations of block 1510 may be performed according to the methods described with reference to FIGS. 1 through 4. In certain examples, aspects of the operations of block 1510 may be performed by a frequency resource component as described with reference to FIGS. 5 through 8.

At block 1515 the base station 105 may allocate a second frequency resource for transmission of a second subset of the OFDM symbols, the second frequency resource being different than the first frequency resource. The operations of block 1515 may be performed according to the methods described with reference to FIGS. 1 through 4. In certain examples, aspects of the operations of block 1515 may be performed by a frequency resource component as described with reference to FIGS. 5 through 8.

At block 1520 the base station 105 may determine a first transmission power for the first subset of the OFDM symbols, the first subset having two OFDM symbols. The operations of block 1520 may be performed according to the methods described with reference to FIGS. 1 through 4. In certain examples, aspects of the operations of block 1520 may be performed by a power determination component as described with reference to FIGS. 5 through 8.

At block 1525 the base station 105 may apply a power offset to the first transmission power to determine a second transmission power for the second subset of the OFDM symbols, the second subset having one OFDM symbol. The operations of block 1525 may be performed according to the methods described with reference to FIGS. 1 through 4. In certain examples, aspects of the operations of block 1525 may be performed by a power offset component as described with reference to FIGS. 5 through 8.

At block 1530 the base station 105 may transmit an uplink grant for the first uplink TTI to a user equipment (UE), the uplink grant including an indication of the first frequency resource and the second frequency resource. The operations of block 1530 may be performed according to the methods described with reference to FIGS. 1 through 4. In certain examples, aspects of the operations of block 1530 may be performed by a grant transmission component as described with reference to FIGS. 5 through 8.

Figure 16:
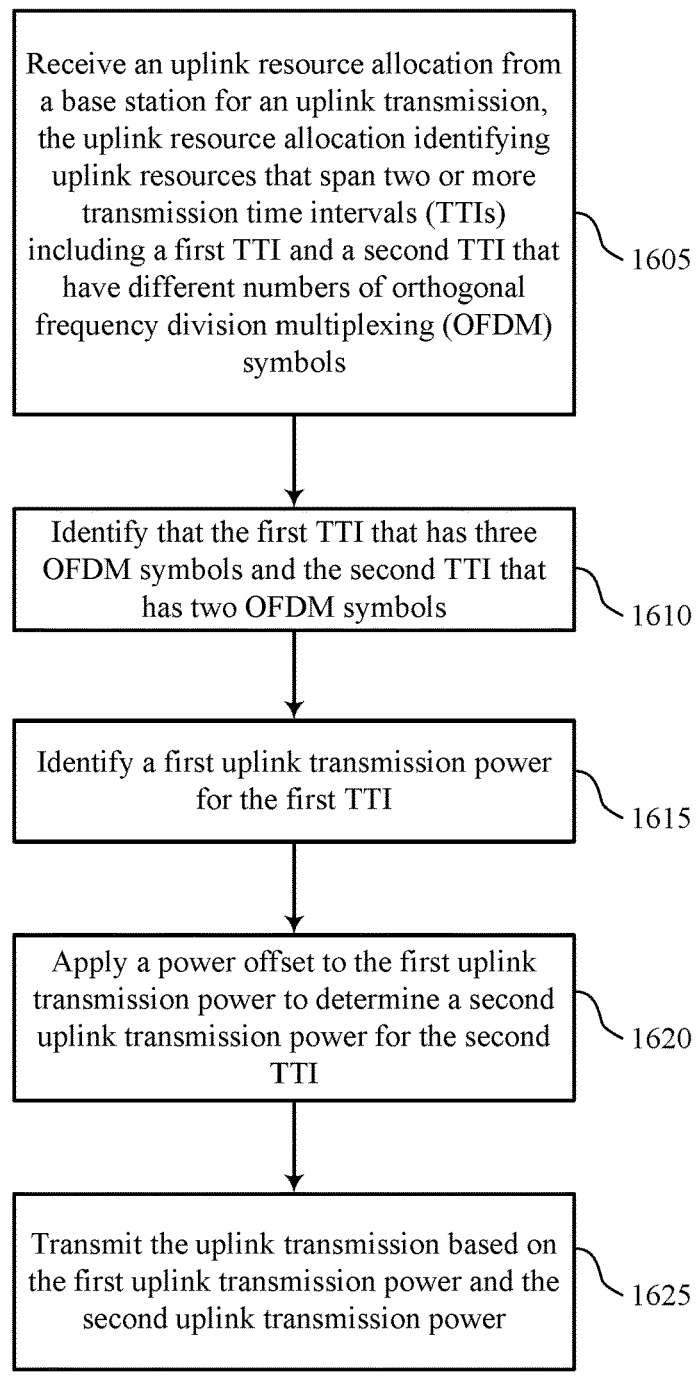

FIG. 16 shows a flowchart illustrating a method 1600 for uplink transmission techniques in low latency wireless communication systems in accordance with various aspects of the present disclosure. The operations of method 1600 may be implemented by a UE 115 or its components as described herein. For example, the operations of method 1600 may be performed by a UE transmission manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may receive an uplink resource allocation from a base station for an uplink transmission, the uplink resource allocation identifying uplink resources that span two or more transmission time intervals (TTIs) including a first TTI and a second TTI that have different numbers of orthogonal frequency division multiplexing (OFDM) symbols. The operations of block 1605 may be performed according to the methods described with reference to FIGS. 1 through 4. In certain examples, aspects of the operations of block 1605 may be performed by a resource allocation component as described with reference to FIGS. 9 through 12.

At block 1610 the UE 115 may identify that the first TTI that has three OFDM symbols and the second TTI that has two OFDM symbols. The operations of block 1610 may be performed according to the methods described with reference to FIGS. 1 through 4. In certain examples, aspects of the operations of block 1610 may be performed by a resource allocation component as described with reference to FIGS. 9 through 12.

At block 1615 the UE 115 may identify a first uplink transmission power for the first TTI. The operations of block 1615 may be performed according to the methods described with reference to FIGS. 1 through 4. In certain examples, aspects of the operations of block 1615 may be performed by a power determination component as described with reference to FIGS. 9 through 12.

At block 1620 the UE 115 may apply a power offset to the first uplink transmission power to determine a second uplink transmission power for the second TTI. The operations of block 1620 may be performed according to the methods described with reference to FIGS. 1 through 4. In certain examples, aspects of the operations of block 1620 may be performed by a power offset component as described with reference to FIGS. 9 through 12.

At block 1625 the UE 115 may transmit the uplink transmission based at least in part on the first uplink transmission power and the second uplink transmission power. The operations of block 1625 may be performed according to the methods described with reference to FIGS. 1 through 4. In certain examples, aspects of the operations of block 1625 may be performed by a uplink transmission component as described with reference to FIGS. 9 through 12.

Figure 17:
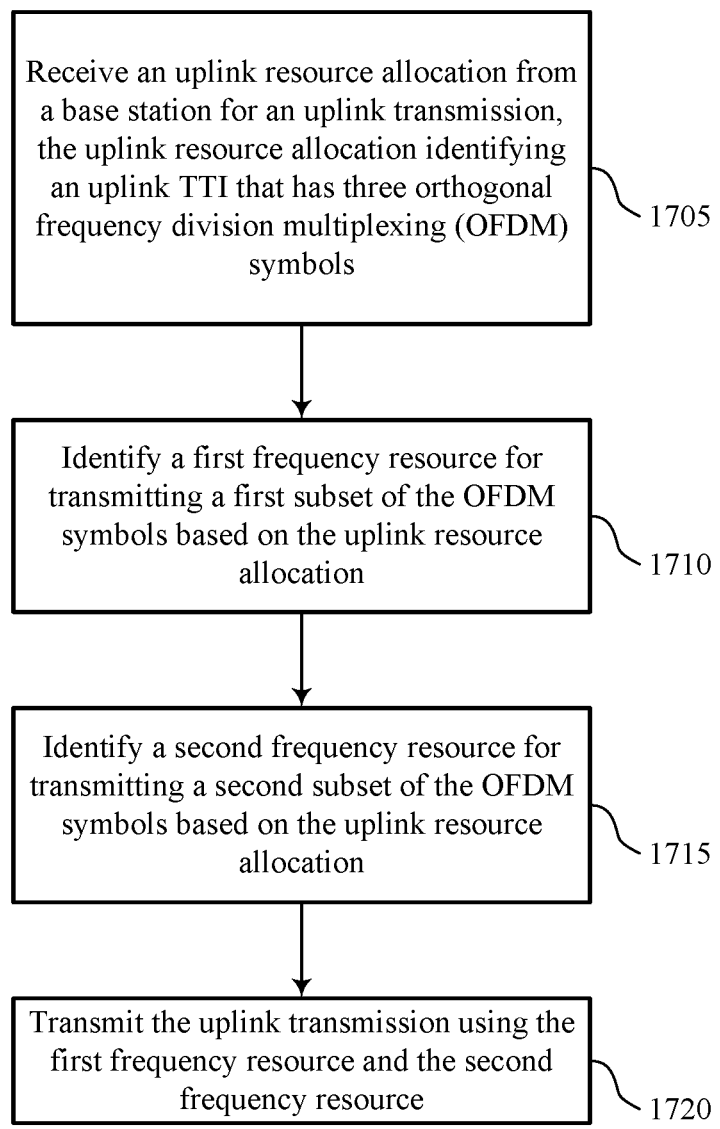

FIG. 17 shows a flowchart illustrating a method 1700 for uplink transmission techniques in low latency wireless communication systems in accordance with various aspects of the present disclosure. The operations of method 1700 may be implemented by a UE 115 or its components as described herein. For example, the operations of method 1700 may be performed by a UE transmission manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may receive an uplink resource allocation from a base station for an uplink transmission, the uplink resource allocation identifying an uplink transmission time interval (TTI) that has three orthogonal frequency division multiplexing (OFDM) symbols. The operations of block 1705 may be performed according to the methods described with reference to FIGS. 1 through 4. In certain examples, aspects of the operations of block 1705 may be performed by a resource allocation component as described with reference to FIGS. 9 through 12.

At block 1710 the UE 115 may identify a first frequency resource for transmitting a first subset of the OFDM symbols based at least in part on the uplink resource allocation. The operations of block 1710 may be performed according to the methods described with reference to FIGS. 1 through 4. In certain examples, aspects of the operations of block 1710 may be performed by a frequency resource component as described with reference to FIGS. 9 through 12.

At block 1715 the UE 115 may identify a second frequency resource for transmitting a second subset of the OFDM symbols based at least in part on the uplink resource allocation. The operations of block 1715 may be performed according to the methods described with reference to FIGS. 1 through 4. In certain examples, aspects of the operations of block 1715 may be performed by a frequency resource component as described with reference to FIGS. 9 through 12.

At block 1720 the UE 115 may transmit the uplink transmission using the first frequency resource and the second frequency resource. The operations of block 1720 may be performed according to the methods described with reference to FIGS. 1 through 4. In certain examples, aspects of the operations of block 1720 may be performed by a uplink transmission component as described with reference to FIGS. 9 through 12.

Figure 18:
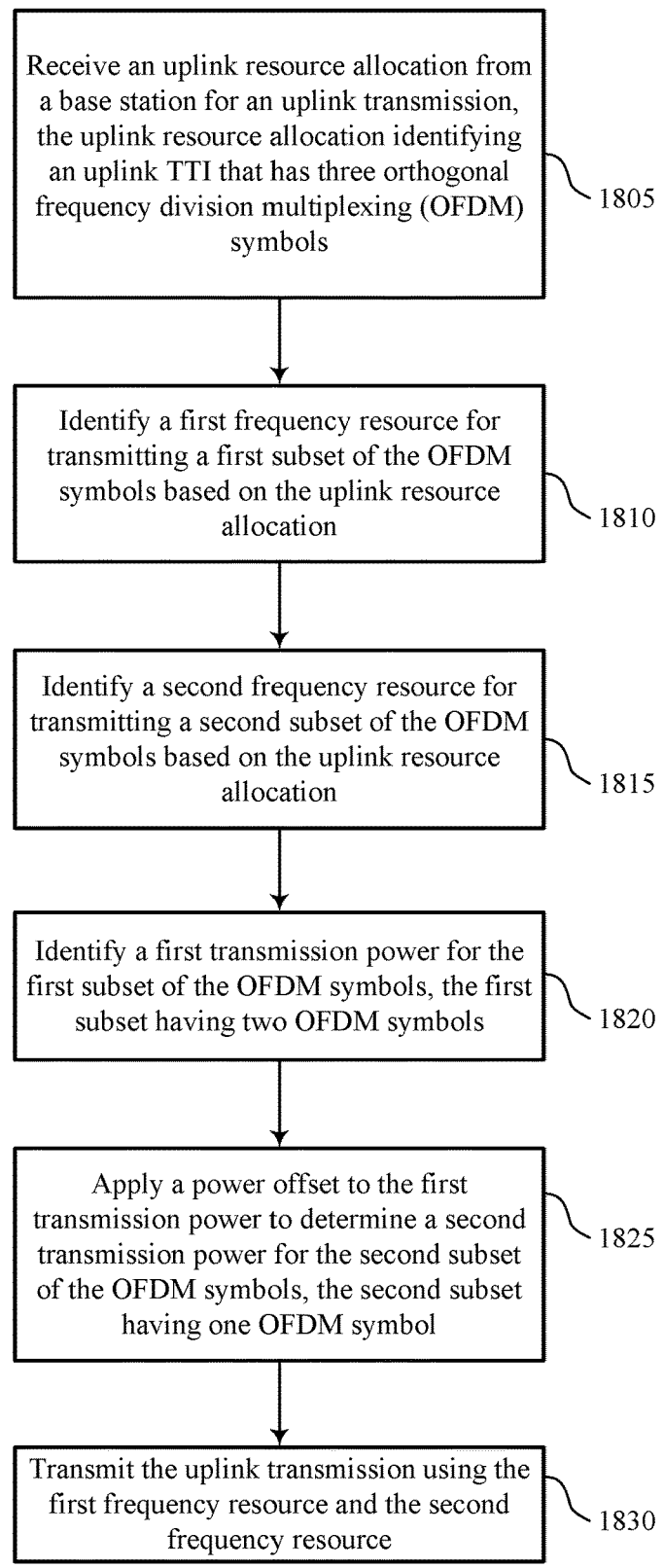

FIG. 18 shows a flowchart illustrating a method 1800 for uplink transmission techniques in low latency wireless communication systems in accordance with various aspects of the present disclosure. The operations of method 1800 may be implemented by a UE 115 or its components as described herein. For example, the operations of method 1800 may be performed by a UE transmission manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive an uplink resource allocation from a base station for an uplink transmission, the uplink resource allocation identifying an uplink transmission time interval (TTI) that has three orthogonal frequency division multiplexing (OFDM) symbols. The operations of block 1805 may be performed according to the methods described with reference to FIGS. 1 through 4. In certain examples, aspects of the operations of block 1805 may be performed by a resource allocation component as described with reference to FIGS. 9 through 12.

At block 1810 the UE 115 may identify a first frequency resource for transmitting a first subset of the OFDM symbols based at least in part on the uplink resource allocation. The operations of block 1810 may be performed according to the methods described with reference to FIGS. 1 through 4. In certain examples, aspects of the operations of block 1810 may be performed by a frequency resource component as described with reference to FIGS. 9 through 12.

At block 1815 the UE 115 may identify a second frequency resource for transmitting a second subset of the OFDM symbols based at least in part on the uplink resource allocation. The operations of block 1815 may be performed according to the methods described with reference to FIGS. 1 through 4. In certain examples, aspects of the operations of block 1815 may be performed by a frequency resource component as described with reference to FIGS. 9 through 12.

At block 1820 the UE 115 may identify a first transmission power for the first subset of the OFDM symbols, the first subset having two OFDM symbols. The operations of block 1820 may be performed according to the methods described with reference to FIGS. 1 through 4. In certain examples, aspects of the operations of block 1820 may be performed by a power determination component as described with reference to FIGS. 9 through 12.

At block 1825 the UE 115 may apply a power offset to the first transmission power to determine a second transmission power for the second subset of the OFDM symbols, the second subset having one OFDM symbol. The operations of block 1825 may be performed according to the methods described with reference to FIGS. 1 through 4. In certain examples, aspects of the operations of block 1825 may be performed by a power offset component as described with reference to FIGS. 9 through 12.

At block 1830 the UE 115 may transmit the uplink transmission using the first frequency resource and the second frequency resource. The operations of block 1830 may be performed according to the methods described with reference to FIGS. 1 through 4. In certain examples, aspects of the operations of block 1830 may be performed by a uplink transmission component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving an uplink resource allocation for an uplink transmission, the uplink resource allocation identifying an uplink transmission time interval (TTI) including a number of symbols;
   identifying a first frequency resource for transmitting a first subset of the symbols based at least in part on the uplink resource allocation;
   identifying a second frequency resource for transmitting a second subset of the symbols based at least in part on the uplink resource allocation; and
   transmitting the uplink transmission using the first frequency resource and the second frequency resource, wherein the first subset of the symbols, the second subset of the symbols, or both, includes both a data signal and a pilot signal.

2. The method of claim 1, wherein the first subset of the symbols has two symbols and the second subset of the symbols has one symbol.

3. The method of claim 2, further comprising:
   configuring a first symbol of the first subset of the symbols for a pilot signal transmission and a second symbol of the first subset of the symbols for a data transmission.

4. The method of claim 2, further comprising:
   configuring the one symbol of the second subset of the symbols for transmission of both data and a pilot signal.

5. The method of claim 1, wherein the first subset of the symbols is to be transmitted at a beginning of a wireless transmission subframe, and wherein the first subset of the symbols has two symbols.

6. The method of claim 5, wherein a first symbol of the first subset of the symbols is located at the beginning of the wireless transmission subframe and is unallocated for data or pilot signal transmissions and a second symbol of the first subset of the symbols is allocated for transmission of both data and a pilot signal.

7. The method of claim 1, wherein the second subset of the symbols is to be transmitted at an end of a wireless transmission subframe, and wherein the second subset of the symbols has two symbols.

8. The method of claim 7, wherein a last symbol of the second subset of the symbols is located at the end of the wireless transmission subframe and is configured for a sounding reference signal (SRS) transmission, and wherein a first symbol of the second subset of the symbols that precedes the last symbol of the second subset of the symbols is allocated for transmission of both data and a pilot signal.

9. The method of claim 1, further comprising:
   identifying a first transmission power for the first subset of the symbols, wherein the first subset of the symbols has two symbols; and
   applying a power offset to the first transmission power to determine a second transmission power for the second subset of the symbols, wherein the second subset of the symbols has one symbol.

10. The method of claim 9, wherein the power offset increases a transmission power for the second subset of the symbols to compensate for reduced time diversity and achievable energy per bit of the second subset of the symbols relative to the first subset of the symbols.

11. The method of claim 9, further comprising:
    receiving the power offset with the uplink resource allocation.

12. The method of claim 9, further comprising:
    receiving, prior to the receiving the uplink resource allocation, a configuration with the power offset.

13. The method of claim 1, wherein the number of symbols are contained within a slot, and wherein the uplink transmission is a physical uplink control channel transmission.

14. An apparatus for wireless communication, comprising:
    one or more processors,
    one or more memories coupled with the one or more processors; and
    instructions stored in the one or more memories and executable by the one or more processors to cause the apparatus to:
    receive an uplink resource allocation for an uplink transmission, the uplink resource allocation identifying an uplink transmission time interval (TTI) including a number of symbols;
    identify a first frequency resource for transmitting a first subset of the symbols based at least in part on the uplink resource allocation;
    identify a second frequency resource for transmitting a second subset of the symbols based at least in part on the uplink resource allocation; and
    transmit the uplink transmission using the first frequency resource and the second frequency resource, wherein the first subset of the symbols, the second subset of the symbols, or both, includes both a data signal and a pilot signal.

15. The apparatus of claim 14, wherein the first subset of the symbols has two symbols and the second subset of the symbols has one symbol.

16. The apparatus of claim 15, wherein the instructions are further executable by the one or more processors to cause the apparatus to:

configure a first symbol of the first subset of the symbols for a pilot signal transmission and a second symbol of the first subset of the symbols for a data transmission.

17. The apparatus of claim 15, wherein the instructions are further executable by the one or more processors to cause the apparatus to:
configure the one symbol of the second subset of the symbols for transmission of both data and a pilot signal.

18. The apparatus of claim 14, wherein the first subset of the symbols is to be transmitted at a beginning of a wireless transmission subframe, and wherein the first subset of the symbols has two symbols.

19. The apparatus of claim 18, wherein a first symbol of the first subset of the symbols is located at the beginning of the wireless transmission subframe and is unallocated for data or pilot signal transmissions and a second symbol of the first subset of the symbols is allocated for transmission of both data and a pilot signal.

20. The apparatus of claim 14, wherein the second subset of the symbols is to be transmitted at an end of a wireless transmission subframe, and wherein the second subset of the symbols has two symbols.

21. The apparatus of claim 20, wherein a last symbol of the second subset of the symbols is located at the end of the wireless transmission subframe and is configured for a sounding reference signal (SRS) transmission, and wherein a first symbol of the second subset of the symbols that precedes the last symbol of the second subset of the symbols is allocated for transmission of both data and a pilot signal.

22. The apparatus of claim 14, wherein the instructions are further executable by the one or more processors to cause the apparatus to:
identify a first transmission power for the first subset of the symbols, wherein the first subset of the symbols has two symbols; and
apply a power offset to the first transmission power to determine a second transmission power for the second subset of the symbols, wherein the second subset of the symbols has one symbol.

23. The apparatus of claim 22, wherein the power offset increases a transmission power for the second subset of the symbols to compensate for reduced time diversity and achievable energy per bit of the second subset of the symbols relative to the first subset of the symbols.

24. The apparatus of claim 22, wherein the instructions are further executable by the one or more processors to cause the apparatus to:
receive the power offset with the uplink resource allocation.

25. The apparatus of claim 22, wherein the instructions are further executable by the one or more processors to cause the apparatus to:
receive, prior to the reception of the uplink resource allocation, a configuration with the power offset.

26. The apparatus of claim 14, wherein the number of symbols are contained within a slot, and wherein the uplink transmission is a physical uplink control channel transmission.

27. An apparatus for wireless communication, comprising:
one or more processors,
one or more memories coupled with the one or more processors; and
instructions stored in the one or more memories and executable by the one or more processors to cause the apparatus to:
transmit an uplink resource allocation for an uplink transmission, the uplink resource allocation identifying an uplink transmission time interval (TTI) including a number of symbols, wherein the uplink resource allocation comprises a first frequency resource for receiving a first subset of the symbols and a second frequency resource for receiving a second subset of the symbols; and
receive the uplink transmission using the first frequency resource and the second frequency resource, wherein the first subset of the symbols, the second subset of the symbols, or both, includes both a data signal and a pilot signal.

* * * * *